(12) United States Patent
Wang et al.

(10) Patent No.: US 12,665,634 B2
(45) Date of Patent: Jun. 23, 2026

(54) MULTIPLE-INPUT, MULTIPLE-OUTPUT TRANSMISSIONS USING ADAPTIVE PHASE-CHANGING DEVICES

(71) Applicant: Google LLC, Mountain View, CA (US)

(72) Inventors: Jibing Wang, San Jose, CA (US); Erik Richard Stauffer, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/719,155

(22) PCT Filed: Dec. 22, 2022

(86) PCT No.: PCT/US2022/082266
§ 371 (c)(1),
(2) Date: Jun. 12, 2024

(87) PCT Pub. No.: WO2023/129872
PCT Pub. Date: Jul. 6, 2023

(65) Prior Publication Data
US 2025/0055507 A1      Feb. 13, 2025

Related U.S. Application Data

(60) Provisional application No. 63/294,305, filed on Dec. 28, 2021.

(51) Int. Cl.
*H04B 7/0413* (2017.01)
*H04B 7/06* (2006.01)

(52) U.S. Cl.
CPC ......... *H04B 7/0413* (2013.01); *H04B 7/0626* (2013.01)

(58) Field of Classification Search
CPC .. H04B 7/0626; H04B 7/0413; H04B 7/0617; H04B 7/0452
See application file for complete search history.

(56) References Cited

U.S. PATENT DOCUMENTS 8,014,745 B1 *    9/2011    Ho .......................... H04B 1/525
                                                           455/278.1
11,419,125 B1    8/2022    Marupaduga et al.
(Continued)

FOREIGN PATENT DOCUMENTS

WO          2021092746 A1       5/2021
WO          2021236510          11/2021
(Continued)

OTHER PUBLICATIONS

"International Preliminary Report on Patentability", Application No. PCT/US2022/082266, Mar. 7, 2024, 16 pages.
(Continued)

*Primary Examiner* — Rahel Guarino
(74) *Attorney, Agent, or Firm* — Colby Nipper PLLC

(57) ABSTRACT

Techniques and apparatuses are described for multiple-input multiple-output transmissions using adaptive phase-changing devices. In aspects, a base station selects one or more adaptive phase-changing devices, APDs, to use in at least one communication path for multiple-input, multiple-output, MIMO, transmissions. The base station can perform a channel characterization process for the at least one communication path using the at least one APD and at least one UE. Based on results of the channel characterization process, the base station configures the at least one APD by which to implement single user-MIMO communication with a UE or multiple user-MIMO communication with multiple UEs. By so doing, the base station may implement MIMO transmissions using APDs to communicate with the at least one UE using same time and frequency resources, which can improve spectral efficiency of a wireless network.

20 Claims, 13 Drawing Sheets

400

| Surface-Configuration Codebook 408 | | | |
|---|---|---|---|
| Index | Configuration for Element 402 | Configuration for Element 404 | Configuration for Element 406 | ... |
| 0 | Phase Configuration 0 | Phase Configuration 1 | Phase Configuration 2 | ... |
| 1 | Phase Configuration 3 | Phase Configuration 4 | Phase Configuration 5 | ... |
| 2 | Phase Configuration 6 | Phase Configuration 7 | Phase Configuration 8 | ... |
| 3 | ... | ... | ... | ... |

(56) References Cited

U.S. PATENT DOCUMENTS

| 2015/0043450 A1 | 2/2015 | Ariyavisitakul et al. |
| 2017/0033847 A1 | 2/2017 | Lomayev et al. |
| 2021/0211160 A1 | 7/2021 | Rofougaran et al. |

FOREIGN PATENT DOCUMENTS

| WO | 2022151128 | 7/2022 |
| WO | 2023129872 | 7/2023 |

OTHER PUBLICATIONS

"International Search Report and Written Opinion", Application No. PCT/US2022/082266, May 2, 2023, 17 pages.
"Written Opinion", Application No. PCT/US2022/082266, Oct. 18, 2023, 13 pages.
Yang, et al., "MIMO Detection for Reconfigurable Intelligent Surface-Assisted Millimeter Wave Systems", Apr. 13, 20202, 16 pages.
"Foreign Office Action", JP Application No. 2024-539332, Jun. 17, 2025, 12 pages.

* cited by examiner

Figure 3:
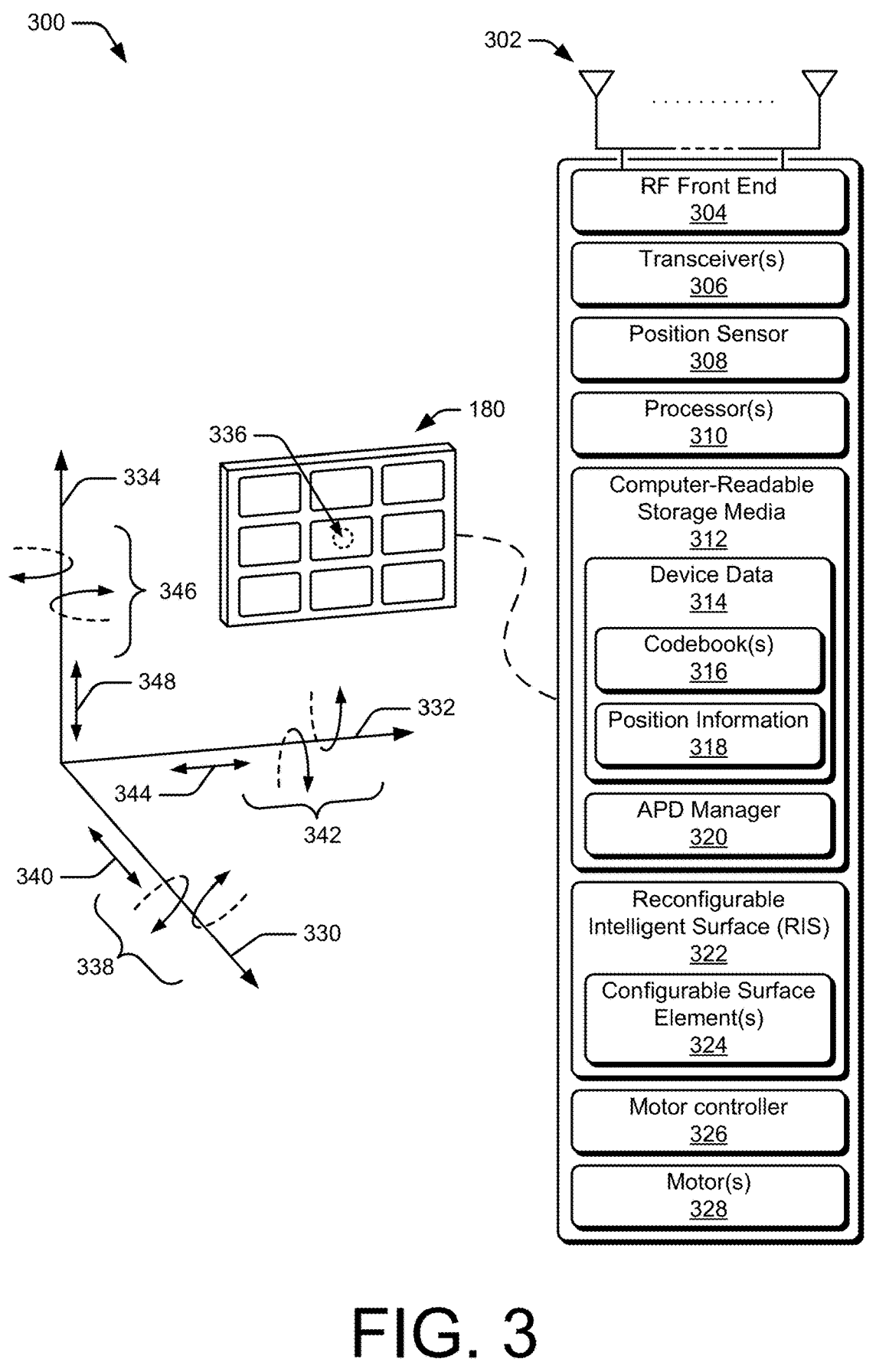

300

302

| RF Front End |
| 304 |

| Transceiver(s) |
| 306 |

| Position Sensor |
| 308 |

| Processor(s) |
| 310 |

Computer-Readable
Storage Media
312

Device Data
314

Codebook(s)
316

Position Information
318

APD Manager
320

Reconfigurable
Intelligent Surface (RIS)
322

Configurable Surface
Element(s)
324

Motor controller
326

Motor(s)
328

| Surface-Configuration Codebook 408 | | | |
|---|---|---|---|
| Index | Configuration for Element 402 | Configuration for Element 404 | Configuration for Element 406 | ... |
| 0 | Phase Configuration 0 | Phase Configuration 1 | Phase Configuration 2 | ... |
| 1 | Phase Configuration 3 | Phase Configuration 4 | Phase Configuration 5 | ... |
| 2 | Phase Configuration 6 | Phase Configuration 7 | Phase Configuration 8 | ... |
| 3 | ... | ... | ... | ... |

Figure 5A:
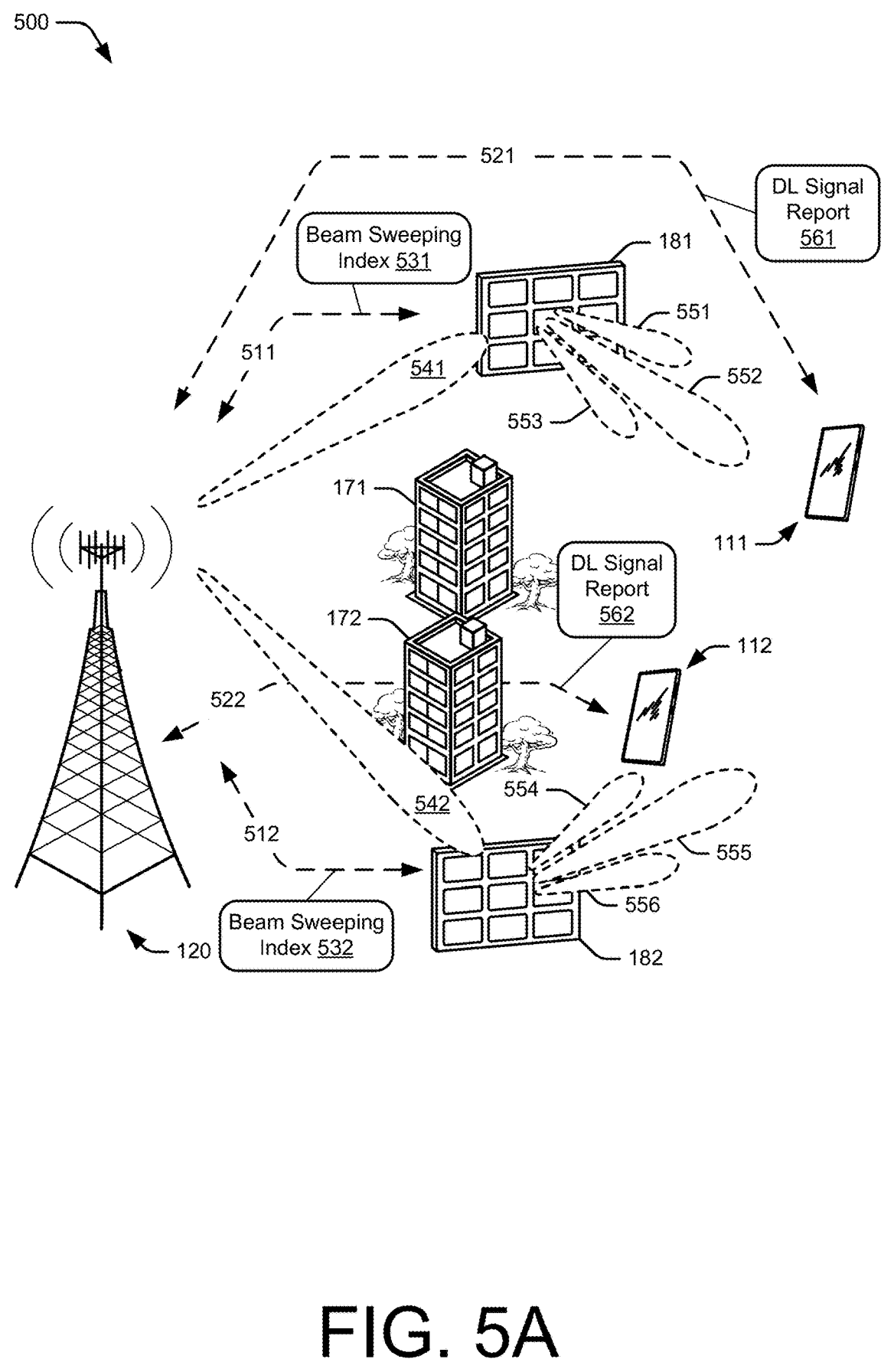

500

521

DL Signal Report 561

Beam Sweeping Index 531

181

551

511

552

541

553

171

DL Signal Report 562

111

172

522

542

554

112

512

555

556

Beam Sweeping Index 532

Surface
Configuration
611

181

511

671

661

621

171

651

641

UE TA
value
632

172

521

111

522

UE TA
value
631

672

622

112

662

642

512

652

Surface
Configuration
612

182

120

Figure 7:
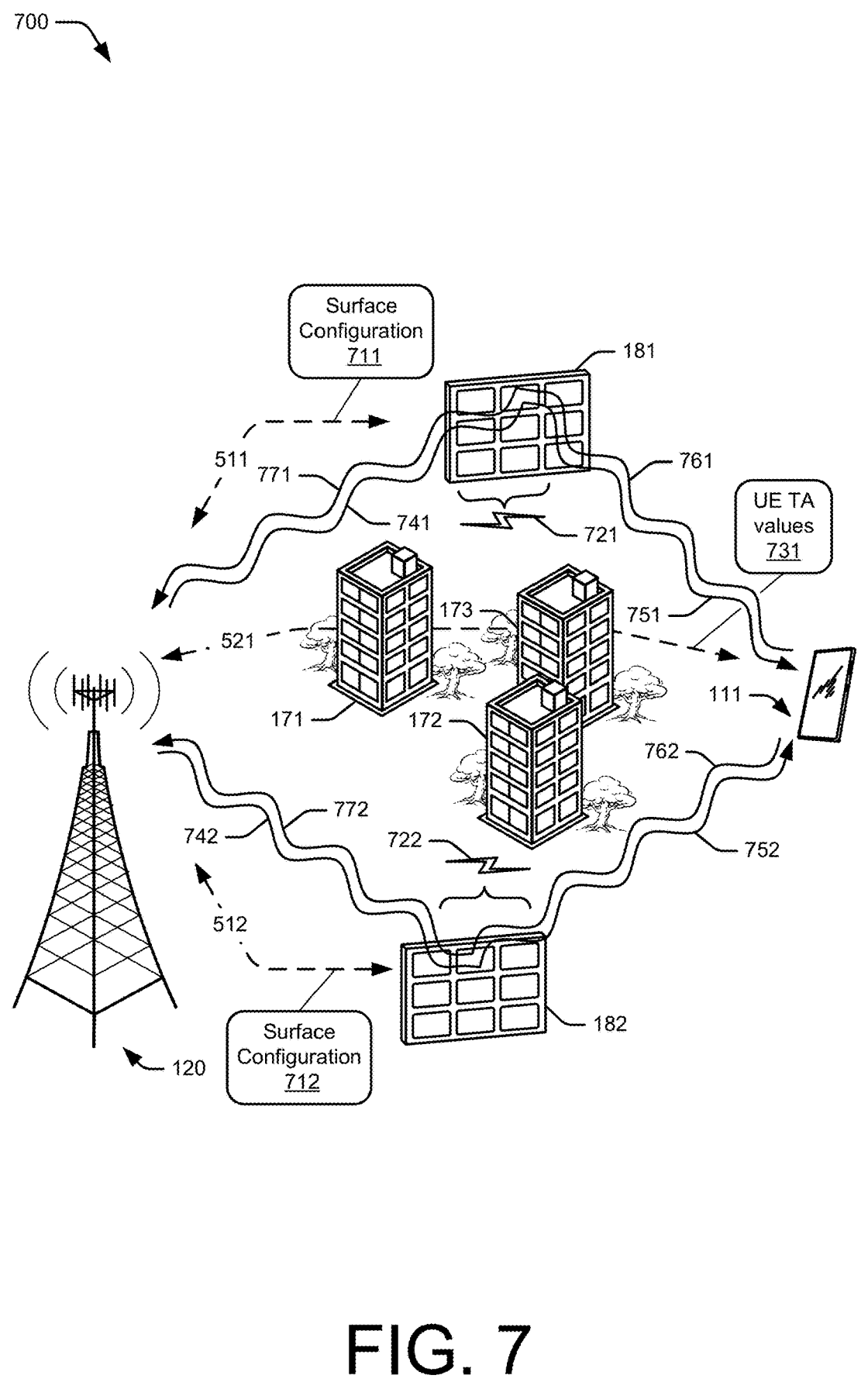

700

Surface
Configuration
711

181

511    771

741    721

761

UE TA
values
731

173

751

171    172

521

111

120

772

722    762

742    752

512

Surface
Configuration
712

Surface configurations
811

181

821

881

511

871

882

872

841

842

822

852

862

851

861

111

112

UE TA value
832

171

521

172

522

UE TA value
831

120

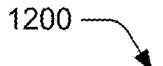

1200

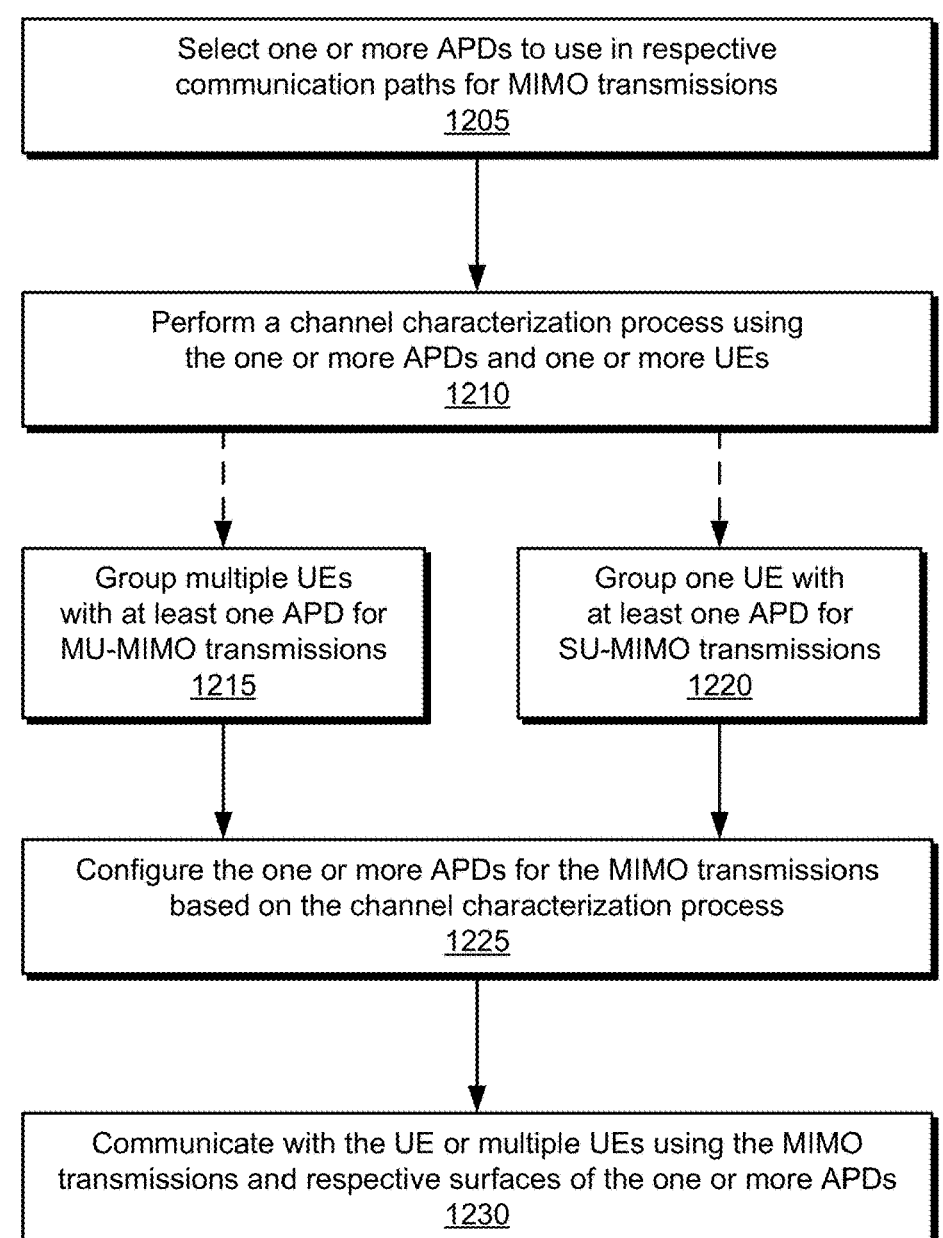

Select one or more APDs to use in respective
communication paths for MIMO transmissions
1205

Perform a channel characterization process using
the one or more APDs and one or more UEs
1210

Group multiple UEs
with at least one APD for
MU-MIMO transmissions
1215

Group one UE with
at least one APD for
SU-MIMO transmissions
1220

Configure the one or more APDs for the MIMO transmissions
based on the channel characterization process
1225

Communicate with the UE or multiple UEs using the MIMO
transmissions and respective surfaces of the one or more APDs
1230

FIG. 12

MULTIPLE-INPUT, MULTIPLE-OUTPUT TRANSMISSIONS USING ADAPTIVE PHASE-CHANGING DEVICES

RELATED APPLICATION(S)

This application is a national stage entry of International Application No. PCT/US2022/082266, filed Dec. 22, 2022, which claims the benefit of U.S. Provisional Application No. 63/294,305, filed Dec. 28, 2021, the disclosures of which are incorporated herein by reference in their entirety.

BACKGROUND

Evolving wireless communication systems, such as fifth generation (5G) and sixth generation (6G) technologies, use various techniques to increase data capacity relative to preceding wireless networks. As one example, 5G technologies transmit data using higher frequency ranges, such as an above-6 gigahertz (GHz) band and sometimes called milli-meter wave (mmWave) range. As another example, 5G technologies increase data capacity in the wireless networks by using multiple-input, multiple-output (MIMO) transmissions.

While these techniques are capable of increasing data rates, transmitting and recovering information using higher frequency ranges also poses challenges. The higher frequency signals are more susceptible to obstructions, atmospheric conditions, multipath fading, and other types of path loss, which lead to recovery errors, reduced throughput, or wireless link degradation at a receiver.

SUMMARY

This document describes techniques and apparatuses that enable multiple-input, multiple-output (MIMO) transmissions using adaptive phase-changing devices (APDs). In aspects, a base station selects one or more APDs to use in at least one communication path for MIMO transmissions. The base station can perform a channel characterization process for the at least one communication path using the one or more APDs and one or more user equipments (UEs). Based on results of the channel characterization process (e.g., uplink or downlink channel measurements), the base station configures the one or more APDs by which to implement single user-MIMO (SU-MIMO) communication with a UE or multiple user-MIMO (MU-MIMO) communications with multiple UEs. By so doing, the base station may implement MIMO transmissions using APDs to communicate with the one or more UEs using same time and frequency resources with different spatial resources, which can improve spectral efficiency of a wireless network.

The details of one or more implementations of MIMO transmissions using APDs are set forth in the accompanying drawings and the following description. Other features and advantages will be apparent from the description and drawings, and from the appended claims. This summary introduces subject matter that is further described in the Detailed Description and Drawings. Accordingly, this summary should not be considered to describe essential features nor used to limit the scope of the claimed subject matter.

BRIEF DESCRIPTION OF THE DRAWINGS

The details of one or more aspects of multiple-input multiple-output (MIMO) transmissions using adaptive phase-changing devices (APDs) are described with reference to the following drawings. The same numbers are used throughout the drawings to reference like features and components:

FIG. 3 illustrates an example device diagram of an APD that can be used to implement various aspects of MIMO transmissions using APDs;

FIGS. 5A and 5B illustrate examples of channel characterization processes that can be used to implement various aspects of MIMO transmissions using APDs;

FIG. 7 illustrates an example of using multiple APDs for MIMO transmissions with a user equipment in accordance with one or more aspects;

FIG. 12 illustrates an example method that can be used to implement various aspects of MIMO transmissions using APDs.

DETAILED DESCRIPTION

Figure 1:
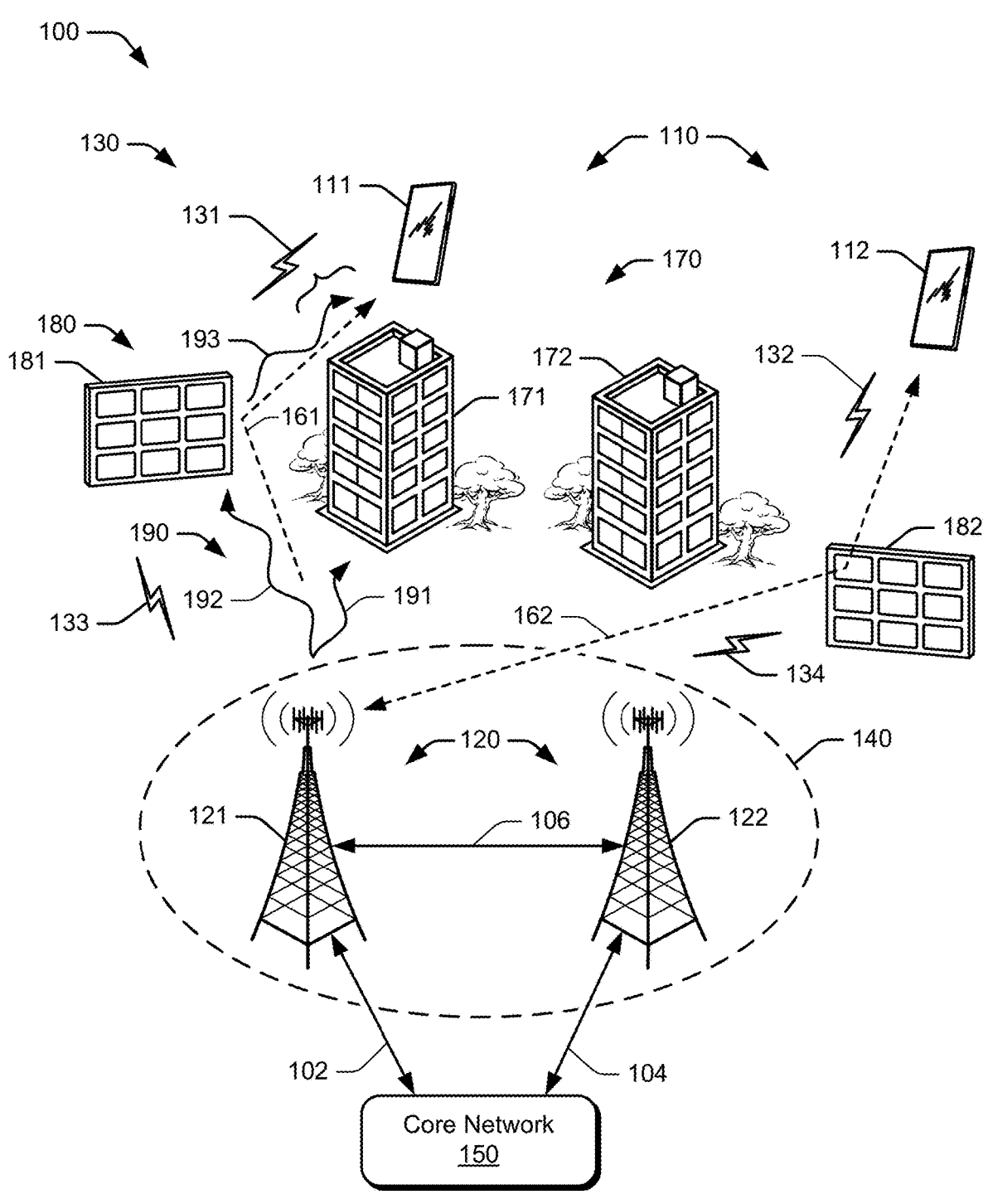
FIG. 1 illustrates an example operating environment in which various aspects of MIMO transmissions using APDs can be implemented.

While higher frequencies and MIMO transmissions provide higher data throughput, channel conditions can negatively impact these techniques. As an example, mmWave signals have high throughput under Line of Sight (LoS) conditions, but reflections create multipath and frequency-selective fading that may increase recovery errors at the receiver. Various environments, such as dense urban areas, include multiple obstructions that further diminish signal quality and make the deployment of high-frequency communications in these environments more difficult.

Adaptive phase-changing devices (APDs) include a Reconfigurable Intelligent Surface (RIS) that, when properly configured, modifies propagating signals to correct for, or reduce, errors introduced by communication path(s), such as various obstructions, small-scale fading, and fading MIMO channels. Generally, an RIS includes configurable surface materials that shape how incident signals striking the surface of the materials are transformed and reflected. To illustrate, the configuration of the surface materials can affect the phase, amplitude, direction, spatial coverage area, and/or polarization of the transformed signal. Thus, modifying a surface configuration of the RIS changes how incident signals are transformed when they reflect off the RIS, which may be useful to provide additional, modified, or alternative communication paths for downlink and/or uplink communications between a base station and one or more UEs. Use of an APD in a communication path, however, typically requires that an RIS of the APD be configured specifically for the communication path, which can vary over time due to dynamic channel conditions, UE movement, air interface resource allocations, and so forth. For example, adding an APD to a channel changes propagation delay through the channel, particularly round trip propagation delay for uplink and downlink communications. As such, specific configuration of APDs and UEs by the base station to support MIMO transmissions through communication paths can be challenging due to these time-varying channel conditions and communication constraints.

In aspects of MIMO transmissions using APDs, a base station may use APDs to route and/or transform MIMO transmissions to improve a signal quality of MIMO communications exchanged between the base station and the UE(s), which results in performance benefits (e.g., improved signal quality, increased data capacity) without necessitating LoS between the base station and the UEs. To illustrate, a transmitting device (e.g., a base station or a user equipment) uses an APD to route wireless signals towards a second (receiving) wireless device (e.g., a user equipment or a base station) by routing the wireless signals around obstructions that might otherwise cause recovery errors at a receiver and/or prevent a wireless signal from reaching the receiver. In aspects, the base station can adjust timing calculations (e.g., timing advance calculations) for one or more communication paths (e.g., to account for propagation delay) when coordinating operation of the APDs and/or UEs for MIMO transmissions such that the MIMO transmissions (e.g., APD-reflected UE or BS transmissions) arrive at the receiving device at approximately the same time (e.g., within a cyclic prefix). Alternatively or additionally, a base station selects a surface configuration for the APD that transforms characteristics of the wireless signal to improve signal quality (e.g., a surface configuration selected to mitigate destructive interference). Using APDs to route and/or transform MIMO transmissions also allows the base station to reuse air interface resources (e.g., time and frequency resources) for the different MIMO transmissions and use spatial resources to improve spectral efficiency and data throughput in the wireless network.

In aspects, a base station selects one or more APDs to include in at least one communication path for MIMO transmissions with one or more UEs. As one example, the base station may select candidate APDs in response detecting deteriorating channel conditions for communicating with the one or more UEs. Generally, the base station may initiate or perform a channel characterization process to facilitate a selection of APDs, a selection of UEs, and/or configuring respective surfaces of the APDs for MIMO transmissions. This can include the base station directing each APD to cycle through multiple surface configurations, transmitting channel state information-reference signals (CSI-RSs) towards the respective surfaces of the APDs, and receiving feedback (e.g., downlink signal quality measurements) from the UEs that provide data on which surface configuration yields the best observed signal quality at the UEs relative to other surface configurations. For an uplink, the channel characterization process can include the base station directing each UE to transmit sounding reference signals (SRSs) while the APDs cycle through the multiple surface configurations and the base station generating metrics (e.g., uplink signal quality measurements) on the received SRSs. The base station then selects surface configurations for the APDs based on the signal quality measurements (and/or link quality measurements) as further described with reference to FIGS. 5A and 5B. Alternatively or additionally, the base station may use measurements of the channel characterization process to select which of the UEs and/or APDs to use for the MIMO transmissions. In some aspects, the base station may apply the theorem of reciprocity to use uplink channel measurements or downlink channel measurements to configure the APDs and/or UEs for communications on a link of a reverse direction (e.g., downlink channel characterization for configuring uplink communication), which may be used in time division duplex (TDD) systems or frequency division duplex (FDD) systems that use close or adjacent uplink and downlink frequency bands.

As one example, the base station selects two UEs to pair for MU-MIMO transmissions that use a same frequency and time slot, but different beam directions. The base station selects a first APD to include in a first communication path for MIMO transmissions with a first UE of the pair and selects a second APD to include in a second communication path for MIMO transmissions with a second UE of the pair. Alternatively or additionally, the base station determines to include two APDs in two communication paths to a single UE for SU-MIMO transmissions. In some aspects, the base station determines to utilize a single APD in communication paths for MU-MIMO and/or SU-MIMO transmissions by using panel partitioning or sub-panels of the APD such that a first set of panels on the single APD reflect a first MIMO transmission and second set of panels on the single APD reflect a second MIMO transmission to one or more respective UEs. By so doing, a base station can use the APDs to route and/or transform the MU-MIMO transmissions or SU-MIMO transmissions, which allows the base station to reuse air interface resources (e.g., time and frequency resources) with different spatial resources for the different MIMO transmissions and improve spectral efficiency and data throughput in the wireless network.

While features and concepts of the described systems and methods for MIMO transmissions using APDs can be implemented in any number of different environments, systems, devices, and/or various configurations, various aspects of MIMO transmissions using APDs are described in the context of the following example environments, devices, systems, and configurations.

Example Environment

FIG. 1 illustrates an example environment 100, which includes multiple user equipment 110 (UE 110), illustrated as UE 111 and UE 112. Each UE can communicate with one or more base stations 120 (illustrated as base station 121 and base station 122) through one or more wireless communication links 130 (wireless link 130), illustrated as wireless links 131 and 132. The wireless links also include a wireless link 133 and/or a wireless link 134 that the base stations 120 use to communicate with one or more adaptive phase-changing devices 180 (APDs 180), illustrated as APD 181 and APD 182. In aspects, the base station 120 communicates with the APD 180 to control a surface configuration, position, and/or APD timing adjustments for applying the surface configuration and/or positioning the APD 180. In other implementations, the base station 120 includes a wireline interface for communicating APD-control information (e.g., surface configuration, timing adjustments, position information) to the APD 180. For simplicity, the UE 110 is implemented as a smartphone but may be implemented as any suitable computing or electronic device, such as a mobile communication device, modem, cellular phone, gaming device, navigation device, media device, laptop computer, desktop computer, tablet computer, smart appliance, vehicle-based communication system, or an Internet-of-Things (IoT) device, such as a sensor, relay, or actuator. The base stations 120 (e.g., an Evolved Universal Terrestrial Radio Access Network Node B, E-UTRAN Node B, evolved Node B, eNodeB, eNB, Next Generation Node B, gNode B, gNB, ng-eNB, or the like) may be implemented in a macrocell, microcell, small cell, picocell, distributed base stations, or the like, or any combination thereof.

One or more base stations 120 communicate with the UE 110 using the wireless links 131 and 132, which may be implemented as any suitable type of wireless link. In one example, the base station 121 communicates with the UE 111 using the wireless link 131 and a surface of the APD 181 to route and/or transform wireless signals along a communication path 161 (e.g., a non-LoS path). The wireless link 131 or other wireless links described herein can include wireless signals corresponding to MIMO transmissions with the UE 111, which may include SU-MIMO or MU-MIMO transmissions that enable re-use of same time and frequency resources. In the environment 100, the base station 121 communicates with the UE 112 using the wireless link 132 and the surface of the APD 182 to route and/or transform wireless signals along a communication path 162 and in a similar manner as further described with reference to the UE 111 and the APD 181. This can include wireless signals corresponding to MIMO transmissions with the UE 112, which may include MU-MIMO or SU-MIMO transmissions on a downlink or an uplink of the wireless connection. The environment 100 shows the base station 120 performing MU-MIMO with the UE 111 and the UE 112 and multiple APDs in a manner similar to that described with reference to FIG. 6. However, the various aspects described with reference to the environment 100 can alternatively or additionally be utilized to perform SU-MIMO with a single UE (e.g., as described with reference to FIG. 7) using multiple APDs, MU-MIMO with multiple UEs by panel-partitioning a single APD (e.g., FIG. 8), and/or SU-MIMO with a single UE by panel-partitioning a single APD (e.g., FIG. 9).

The wireless links 131 and 132 include control-plane information and/or user-plane data, such as downlink user-plane data and control-plane information communicated from the base stations 120 to the UEs 110, uplink of other user-plane data and control-plane information communicated from the UEs 110 to the base stations 120, or both. The wireless links 130 may include one or more wireless links (e.g., radio links) or bearers implemented using any suitable communication protocol or standard, or combination of communication protocols or standards, such as 3rd Generation Partnership Project Long-Term Evolution (3GPP LTE), fifth-generation New Radio (5G NR), sixth-generation (6G), and so forth. In various aspects, the base stations 120 and UE 110 may be implemented for operation in sub-gigahertz bands, sub-6 GHz bands (e.g., Frequency Range 1), and/or above-6 GHz bands (e.g., Frequency Range 2, millimeter wave (mmWave) bands) that are defined by one or more of the 3GPP LTE, 5G NR, or 6G communication standards. As one example, the multiple wireless links can include a first sub-6 Gigahertz (GHz) anchor link and a second, above 6 GHz supplementary link. To illustrate, and with reference to FIG. 6, the wireless link 131 can include a first wireless anchor link (e.g., low-band connection 521) using sub-6 GHz wireless signals and a second wireless link (e.g., wireless link 621) using above 6 GHz wireless signals. Multiple wireless links 130 may be aggregated using a carrier aggregation or multi-connectivity technology to provide a higher data rate for the UE 110. Multiple wireless links 130 from multiple base stations 120 may be configured for Coordinated Multipoint (CoMP) communication with the UE 110.

In some implementations, the wireless links (e.g., the wireless links 131 and 132) utilize wireless signals that one or more intermediate devices (e.g., APD 180) reflect or transform, such as reflections that route the wireless signals around obstructions 170 (illustrated as obstruction 171 and obstruction 172). Although the obstruction 171 and obstruction 172 are shown as buildings and foliage, obstructions can range from a more-temporary obstruction such as water vapor or a moving vehicle, to a seasonal obstruction such as the deciduous trees shown, to a more-permanent obstruction such as the building shown. For instance, the base station 121 uses the APD 181 to propagate ray(s) 190 towards (and/or receive from) the UE 111, illustrated as signal ray 191, signal ray 192, and signal ray 193. In the environment 100, the signal ray 190 corresponds to individual rays of a narrow-beam or wide-beam (up to and including omnidirectional) wireless signal used to implement the wireless link 131, such as a downlink wireless signal (illustrated in FIG. 1) from the base station 121 to the UE 111 and/or an uplink wireless signal (not illustrated in FIG. 1) from the UE 111 to the base station 121.

As part of communicating with the UE 111 through wireless link 131, the base station 121 transmits a first downlink wireless signal intended for the UE 111, which corresponds to a MIMO transmission. A first ray of the first downlink wireless signal (e.g., the signal ray 191) propagates toward the UE 111 in a line-of-sight (LoS) manner, where an obstruction 171 dynamically blocks and/or attenuates the LoS signal ray 191. A second ray of the first downlink wireless signal (e.g., the signal ray 192) propagates toward the APD 181. The second signal ray 192 strikes the surface of the APD 181 and transforms into a third signal ray 193 that propagates towards the UE 111 along communication path 161. Similarly, the base station 121 transmits a second downlink signal to the UE 112 using the surface of the APD 182 to route and/or transform wireless signals along the communication path 162.

The base station 120 can configure an RIS of the APD 180 to direct how the RIS alters signal properties (e.g., direction, phase, amplitude, and/or polarization) of an incident wireless signal. In aspects, the base station 120 performs a channel characterization process as further described with reference to FIGS. 5A and 5B to determine the surface configurations for the APD(s) 180. In aspects, the base station 120 communicates respective RIS surface-configuration information to the APD 181 and the APD 182 using the wireless link 133 and/or the wireless link 134 (e.g., an APD control channel), which may include any combination of: an adaptive phase-changing device physical downlink shared channel (APD-PDSCH), an adaptive phase-changing device physical uplink shared channel (APD-PUSCH), an adaptive phase-changing device physical downlink control channel (APD-PDCCH), and/or an adaptive phase-changing device physical uplink control channel (APD-PUCCH). Alternatively or additionally, the base station 120 determines surface configuration(s) for the APD 180 based on location information, downlink signal-quality measurements/parameters received from the UE 110, uplink signal-quality measurements/parameters generated by the base station 120, historical records regarding previous successful and unsuccessful uplink and/or downlink wireless communications (with and/or without APDs in the communication paths), APD locations, UE locations, downlink/uplink (DL/UL) signal strength/quality measurement reports, APD surface configurations (e.g., indices), APD surface configuration codebooks, and so forth. At times, the base station 120 determines and communicates APD timing adjustments (e.g., timing advances, timing delays) to the APD(s) 180 using the wireless link 133 and/or the wireless link 134.

The base stations 120 collectively form at least part of a Radio Access Network 140 (RAN 140, e.g., RAN, Evolved Universal Terrestrial Radio Access Network, E-UTRAN, 5G NR RAN or NR RAN). The base station 121 and base station 122 connect, at 102 and 104 respectively, to a core network 150 through an NG2 interface for control-plane signaling and an NG3 interface for user-plane data communications when connecting to a 5G core network or using an S1 interface for control-plane signaling and user-plane data communications when connecting to an Evolved Packet Core (EPC) network. The UE 110 may connect, via the RAN 140 and core network 150, to public networks such as the Internet, to interact with a remote service (not illustrated in FIG. 1).

The base station 121 and base station 122 can communicate using an Xn Application Protocol (XnAP) through an Xn interface or using an X2 Application Protocol (X2AP) through an X2 interface, at 106, to exchange user-plane and control-plane data. Alternatively or additionally, the base station 121 and base station 122 communicate with one another using a wireless integrated access backhaul (IAB) link (not illustrated in FIG. 1), where one of the base stations acts as a donor base station and the other base station acts as a node base station. In some aspects, the base station 121 and base station 122 include the surface of one or more APDs 180 in a communication path for the IAB link such that the APDs route and/or transform the wireless signals associated with IAB link communications.

Example Devices

Figure 2:
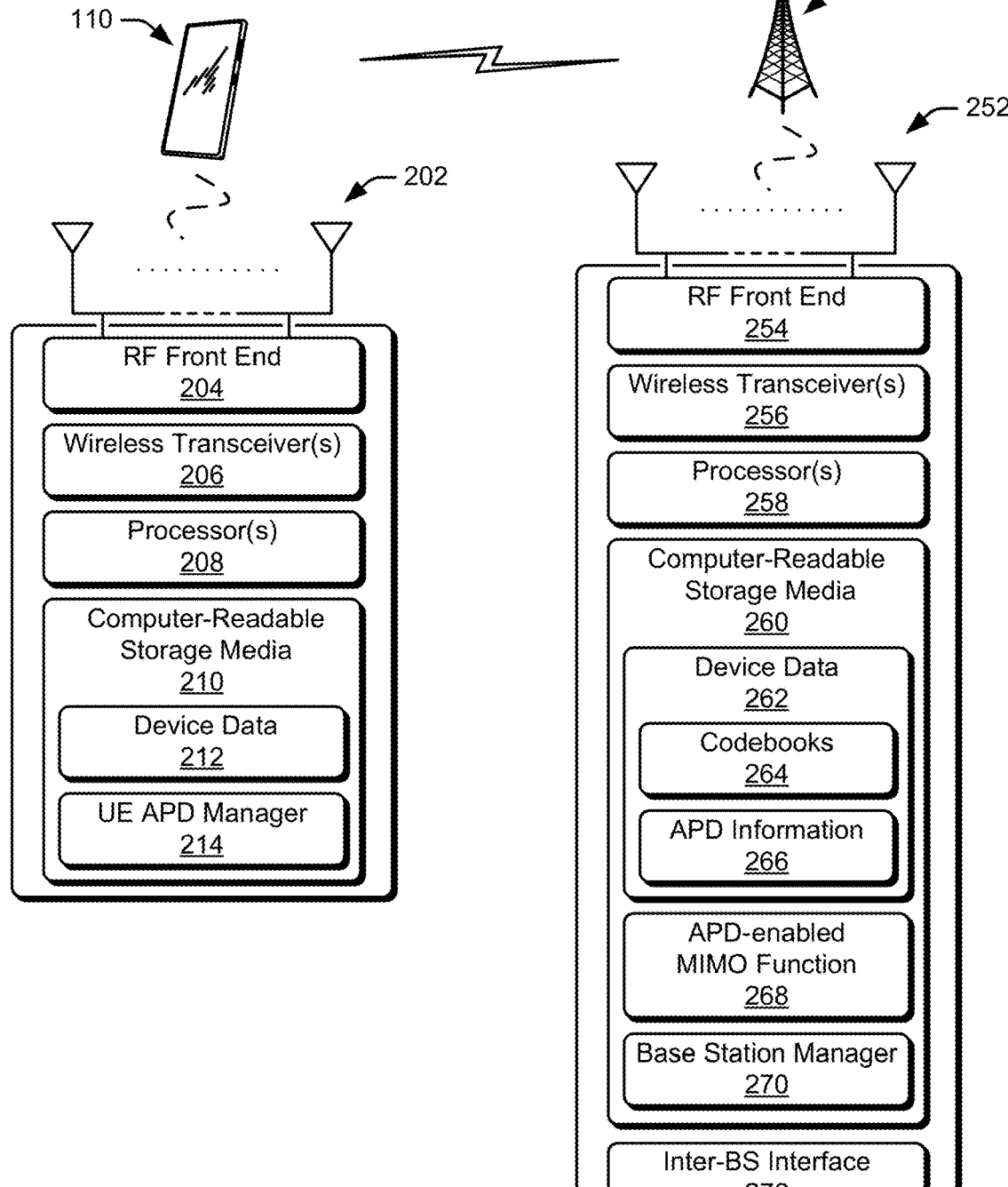
FIG. 2 illustrates an example device diagram of entities that can implement various aspects of MIMO transmissions using APDs.

FIG. 2 illustrates an example device diagram 200 of the user equipments 110 and base stations 120. Generally, the device diagram 200 describes network entities that can implement various aspects of MIMO transmissions using APDs. FIG. 2 shows respective instances of a UE 110 and a base station 120. The UE 110s or the base stations 120 may include additional functions and interfaces that are omitted from FIG. 2 for the sake of visual brevity. The UE 110 includes antennas 202, a radio frequency front end 204 (RF front end 204), and one or more wireless transceivers 206 (e.g., radio frequency transceivers), such as any combination of an LTE transceiver, a 5G NR transceiver, and/or a 6G transceiver for communicating with base stations 120 in the RAN 140. In aspects, an antenna 202 (e.g., antenna array), radio frequency (RF) front end 204, and a wireless transceiver 206 may be implemented as a radio module of the UE 110. For example, the UE 110 may include one or more radio modules (e.g., 5G NR or mmWave modules) capable of implementing respective transmit and/or receive functionalities. The RF front end 204 of the UE 110 can couple or connect the wireless transceivers 206 to the antennas 202 to facilitate various types of wireless communication.

The antennas 202 of the UE 110 may include an array of multiple antennas that are configured in a manner similar to or different from each other. The antennas 202 and the RF front end 204 can be tuned to, and/or be tunable to, one or more frequency bands defined by various communication standards (e.g., 3GPP LTE, 5G NR, 6G) and implemented by the wireless transceivers 206. Additionally, the antennas 202, the RF front end 204, and/or the wireless transceiver(s) 206 may be configured to support beam-sweeping for the transmission and reception of communications with the base stations 120. By way of example and not limitation, the antennas 202 and the RF front end 204 can be implemented for operation in sub-gigahertz bands, sub-6 GHz bands, and/or above-6 GHz bands that are defined by the 3GPP LTE, 5G NR, or 6G communication standards, such as the bands described with reference to FIG. 1.

The UE 110 also includes processor(s) 208 and computer-readable storage media 210 (CRM 210). The processor 208 may be a single-core processor or a multiple-core processor implemented with a homogenous or heterogeneous core structure. The computer-readable storage media described herein excludes propagating signals. CRM 210 may include any suitable memory or storage device such as random-access memory (RAM), static RAM (SRAM), dynamic RAM (DRAM), non-volatile RAM (NVRAM), read-only memory (ROM), or Flash memory useable to store device data 212 of the UE 110. The device data 212 includes any combination of user data, multimedia data, applications, and/or an operating system of the UE 110. In implementations, the device data 212 stores processor-executable instructions that are executable by the processor(s) 208 to enable the UE 110 to communicate user-plane data and/or control-plane information, as well as enable various user interactions (e.g., an application or user interface).

In this example, the CRM 210 of the UE 110 also includes a user equipment adaptive phase-changing device manager 214 (UE APD manager 214) for managing APD usage in an access link with the base station 120. The UE APD manager 214 may be implemented in whole or in part as hardware logic or circuitry integrated with or separate from other components (e.g., wireless transceivers 206) of the UE 110. In aspects, the UE APD manager 214 receives APD-access information for using a surface of an APD, such as reflection-access information that indicates time adjustments for when to apply the APD surface and/or configurable surface element information that indicates portions of the APD surface available to the UE 110. In aspects, the UE APD manager 214 of the UE 110 decodes reflection or beam identifiers (e.g., a CSI reference signal (CSI-RS) resource or a synchronization signal block (SSB) index), analyzes link quality parameters, and generates various APD or channel feedback messages for a base station 120. The UE APD manager 214 may also maintain a low-band connection (e.g., anchor connection) with a base station 120 over a low-frequency band (e.g., sub-6 GHz) to provide signal reflection or beam information for high-frequency signals (e.g., above-6 GHz) used to implement aspects of MIMO transmissions using APDs. The UE 110 may also receive beam sweeping information or phase steering configurations from the base station 120 over the low-band connection. As such, the UE 110 may implement carrier aggregation (CA) to communicate in two frequency bands when communicating with the base station 120 to implement aspects of MIMO transmissions using APDs. Alternatively or additionally, the UE APD manager 214 directs the UE 110 to transmit communications (e.g., uplink sounding signals) to the base station 120 through APD-enabled communication channels (e.g., based on the APD-access information) or through non-APD communication paths (e.g., direct UE-base station communication).

The device diagram for the base station 120, shown in FIG. 2, includes a single network node (e.g., a gNode B). The functionality of the base station 120 may be distributed across multiple network nodes or devices and may be distributed in any fashion suitable to perform the functions described herein. The nomenclature for this distributed base station functionality varies and includes terms such as Central Unit (CU), Distributed Unit (DU), Baseband Unit (BBU), Remote Radio Head (RRH), and/or Remote Radio Unit (RRU). The base station 120 includes antennas 252, a radio-frequency front end 254 (RF front end 254), one or more wireless transceiver(s) 256 (e.g., LTE transceivers, 5G NR transceivers, and/or 6G transceivers) for communicating with the UE 110, other UEs (not shown), and/or another base station 120.

The RF front end 254 of the base station 120 can couple or connect the wireless transceivers 256 (e.g., radio frequency transceivers) to the antennas 252 to facilitate various types of wireless communication. The antennas 252 of the base station 120 may include an array of multiple antennas (e.g., antenna panels or antenna elements) that are configured in a manner similar to or different from each other. The antennas 252 and the RF front end 254 can be tuned to, and/or be tunable to, one or more frequency bands defined by communication standards (e.g., 3GPP LTE, 5GNR, and/or 6G) and implemented by the wireless transceivers 256. Additionally, the antennas 252, the RF front end 254, and/or the wireless transceivers 256 may be configured to support beamforming, such as MU-MIMO, SU-MIMO, and/or Massive-MIMO, for the transmission and reception of communications with the UE 110, other UEs, and/or another base station 120.

The base station 120 also includes processor(s) 258 and computer-readable storage media 260 (CRM 260). The processor 258 may be a single-core processor or a multiple-core processor composed of a variety of materials, such as silicon, polysilicon, high-K dielectric, copper, and so on. The CRM 260 may include any suitable memory or storage device such as RAM, SRAM, DRAM, NVRAM, ROM, or Flash memory useable to store device data 262 of the base stations 120. The device data 262 includes network-scheduling data, radio resource-management data, applications, and/or an operating system of the base station 120, which are executable by processor(s) 258 to enable communication with another base station 120, core network entities, and/or the UE 110. The device data 262 also includes codebooks 264 and APD information 266 for APDs 180 associated with the base station 120. The codebooks 264 may include any suitable type or combination of codebooks, including surface-configuration codebooks that store surface-configuration information for a RIS of an APD and beam-sweeping codebooks that store scan patterns, sequences, or timing information (e.g., propagation delays or timing advances) for implementing multiple surface-configurations useful to direct an APD to perform a variety of reflective beamforming (e.g., APD-enabled MIMO communications). In some aspects, the surface-configuration codebooks and beam-sweeping codebooks include phase-vector information, angular information (e.g., calibrated to respective phase vectors), and/or beam-configuration information. The APD information 266 can include respective identifiers, capabilities, command and control information, locations, orientations (e.g., static or last known), distances, propagation delays for the APDs 180 with which the base station 120 communicates. The base station 120 may generate or revise the APD information 266 to add new APDs 180 that are detected, update information of known APDs 180, or delete existing ADPs 180 that are deprecated.

In aspects, the CRM 260 includes an APD-enabled MIMO function 268 (MIMO function 268) that manages or implements aspects of MIMO transmissions using APDs. Alternatively or additionally, the MIMO function 268 may be implemented in whole or part as hardware logic or circuitry integrated with or separate from other components of the base station 120. Generally, the MIMO function 268 may select one or more APDs to use in at least one communication path for MIMO transmissions. For example, the base station 120 selects candidate APDs that may provide respective non-LoS communication paths for one or more UEs 110 (e.g., a UE with decreasing link quality, LoS obstruction, increasing throughput demand, etc.) to communicate using MIMO transmissions. The base station can then perform a channel characterization process for the at least one communication path using the one or more APDs and one or more UEs, such as described with reference FIGS. 5A, 5B, and/or 11. Based on results of the channel characterization process (e.g., uplink or downlink channel measurements), the base station can select a combination of the UEs and APDs by which to implement multiple user-MIMO (MU-MIMO) communications that utilize the MIMO transmissions, such as described with reference to FIGS. 6, 8, and/or 10, or single user-MIMO (SU-MIMO) communication, such as described with reference to FIGS. 7, 9, and/or 10. By so doing, the base station may communicate with multiple UEs or communicate additional data with a single UE using same time and frequency resources, which can improve spectral efficiency of a wireless network.

The CRM 260 also includes a base station manager 270 for managing various functionalities and communication interfaces of the base stations 120. Alternatively or additionally, the base station manager 270 may be implemented in whole or part as hardware logic or circuitry integrated with or separate from other components of the base stations 120. In at least some aspects, the base station manager 270 configures the antennas 252, RF front end 254, and wireless transceiver(s) 256 for communication with the UE 110, the APDs 180, and/or communication with a core network. The base stations 120 include an inter-base station interface 272, such as an Xn and/or X2 interface, which the base station manager 270 configures to exchange user-plane data and control-plane information between another base station 120, to manage the communication of the base stations 120 with the UE 110. The base stations 120 also include a core network interface (not shown) that the base station manager 270 configures to exchange user-plane data and control-plane information with core network functions and/or entities.

FIG. 3 illustrates an example device diagram 300 of the APD 180. Generally, the device diagram 300 describes an example entity with which various aspects of MIMO transmissions using APDs can be implemented but may include additional functions and interfaces that are omitted from FIG. 3 for the sake of visual brevity. The APD 180 includes one or more antenna(s) 302, a radio frequency front end 304 (RF front end 304), and one or more radio-frequency transceivers 306 (e.g., radio-frequency transceivers, LTE transceivers, 5G NR transceivers, or 6G transceivers) for wirelessly communicating with the base station 120 and/or the UE 110. The APD 180 can also include a position sensor, such as a Global Navigation Satellite System (GNSS) module, that provides position information based on a location of the APD 180.

The antenna(s) 302 of the APD 180 may include an array of multiple antennas that are configured in a manner similar to or different from each other. Additionally, the antennas 302, the RF front end 304, and the transceiver(s) 306 may be configured to support beamforming for the transmission and reception of communications with the base station 120 and/or UE 110. By way of example and not limitation, the antennas 302 and the RF front end 304 can be implemented for operation in sub-gigahertz bands, sub-6 GHz bands, and/or above-6 GHz bands, which may include various frequency bands described with reference to FIG. 1. Thus, the antenna 302, the RF front end 304, and the transceiver(s) 306 provide the APD 180 with an ability to receive and/or transmit communications with the base station 120 and/or the UE 110, such as information transmitted using APD-control-channels (e.g., an APD-slow-control channel or APD-fast-control channel) as further described.

The APD 180 includes processor(s) 310 and computer-readable storage media 312 (CRM 312). The processor 310 may be a single core processor or a multiple-core processor implemented with a homogenous or heterogeneous core structure. The computer-readable storage media described herein excludes propagating signals. The CRM 312 of the APD 180 may include any suitable memory or storage device such as RAM, SRAM, DRAM, NVRAM, ROM, or Flash memory useable to store device data 314 of the APD 180. The device data 314 includes configuration data, RIS information, applications, and/or an operating system of the APD 180, which are executable by processor(s) 310 to enable dynamic configuration of the APD 180 as further described. The device data 314 also includes one or more codebooks 316 of any suitable type or combination, and position information 318 of the APD 180. The position information 318 may be obtained or configured using the position sensor 308 or programmed into the APD 180, such as during installation. The position information 318 indicates a position of the APD 180 and may include a location, geographic coordinates, orientation, elevation information, or the like. A base station 120, MIMO function 268, and/or UE 110 can use the position information 318 in computing angular or distance information, such as for communication paths between the base station 120 and APD 180 and/or between the APD 180 and a UE 110 of interest. The codebooks 316 can include surface-configuration codebooks that store surface-configuration information for a RIS of an APD and beam sweeping codebooks that store patterns, sequences, or timing information (e.g., phase vectors and reflection identifiers) for implementing multiple surface configurations useful to direct an APD to perform a variety of reflective beamforming. In some aspects, the surface-configuration codebooks and beam sweeping codebooks include phase vector information, angular information (e.g., calibrated to respective phase vectors), identifier information, and/or beam configuration information.

In aspects of MIMO transmissions using APDs, the CRM 312 of the APD 180 includes an adaptive phase-changing device manager 320 (APD manager 320). Alternatively or additionally, the APD manager 320 may be implemented in whole or part as hardware logic or circuitry integrated with or separate from other components of the APD 180. Generally, the APD manager 320 manages a surface configuration of the APD 180, such as by processing information exchanged with a base station over wireless link(s) 133, then using the information to configure a reconfigurable intelligent surface 322 (RIS 322) of the APD 180. To illustrate, the APD manager 320 receives an indication of a surface configuration over the wireless links 133 (an APD control channel), extracts the surface configuration from the codebooks 316 using the indication, and applies the surface configuration to the RIS 322. Alternatively or additionally, the APD manager 320 initiates the transmission of uplink messages to the base station over the wireless links 133, such as acknowledgments/negative acknowledgments (ACKs/NACKs) for various APD configuration or management commands. In some aspects, the APD manager 320 receives an indication of a beam sweeping pattern (e.g., beam sweeping pattern index) over the wireless links 133 and/or 134, and applies a sequence of various surface configurations to the RIS based on the beam sweeping pattern and/or in accordance with a synchronization or pattern timing indicated by or received with the indication. Optionally, the beam sweeping pattern may include reflection identifier information by which the APD 180 modulates or applies (e.g., using the RIS) one or more reflection identifiers to a downlink reference signal or uplink sounding signal reflected by the APD 180.

In some aspects, the APD manager 320 receives timing information with the surface configuration communication, where the timing information indicates when to apply the surface configuration to the RIS 322 (e.g., start time, time duration, timing advance, periodic time information, dynamic time information). Alternatively or additionally, the APD manager 320 receives direction information with the surface configuration that indicates to configure the surface to reflect signals of the RIS 322 based on the direction information. For example, when the direction information indicates a BS-to-UE communication direction, the APD manager 320 selects a first surface configuration with a first reflection angle that reflects wireless signals from the base station 120 to the UE 110. When the direction indicates a UE-to-BS communication direction, the APD manager 320 selects a second surface configuration with a second, reciprocal reflection angle that reflects wireless signals from the UE 110 to the base station 120.

The RIS 322 of the APD 180 includes one or more configurable surface element(s) 324, such as configurable electromagnetic elements, configurable resonator elements, or configurable reflectarray antenna elements. Generally, the configurable surface elements 324 can be selectively or programmatically configured to control how the RIS 322 reflects (e.g., directionality) and/or transforms incident waveforms. By way of example and not of limitation, configurable electromagnetic elements include scattering particles that are connected electronically (e.g., through PIN diodes). Implementations use the electronic connection to arrange the scattering particles, such as based on principles of reflection, to control a directionality, phase, amplitude, and/or polarization of the transformed waveform (from the incident waveform). The RIS 322 can include array(s) of independently configurable surface element(s) 324, where an array can include any number of elements having any size.

In some aspects, a position and/or orientation of the APD 180 is configurable and the APD 180 includes a motor controller 326 communicating with one or more motor(s) 328 that are operably coupled with a physical chassis of the APD 180. Based on command-and-control information, such as received from a base station 120, the motor controller 326 can send commands to the motors 328 that alter one or more kinematic behaviors of the motors 328, which may include any suitable type of stepper motor or servo. For example, the motor controller 326 may issue commands or control signals that specify a shaft rotation of a stepper motor in degrees, a shaft rotation rate of a stepper motor in revolutions per minute (RPM), a linear movement of a linear motor millimeters (mm), a linear velocity of a linear motor in meters/second (m/s)). The one or more motors 328, in turn, may be linked to mechanisms that mechanically position the physical chassis or a platform (e.g., avionics of a drone, a drive of a linear rail system, a gimble within a base station, a linear bearing within a base station) supporting the APD 180. Through the commands and signals that the motor controller 326 generates and sends sent to the motors 328, a physical position, location, or orientation of the APD 180

(and/or the platform supporting the APD 180) may be altered. In response to receiving a position configuration from a base station, the APD manager 320 communicates movement commands to the motor controller 326, such as through a software interface and/or hardware addresses, based on the position configuration. In aspects of MIMO transmissions using APDs, a base station 120 may reposition or reorient one or more APDs 180 to improve or enable the reflection of wireless signals (e.g., uplink and/or downlink signals) between the base station 120 and the UE 110.

Generally, the APD 180 can include multiple motors, where each motor corresponds to a different rotational or linear direction of movement. Examples of motor(s) 328 that can be used to control orientation and location of the APD include linear servo motors that might be part of a (i) rail system mounting for the APD, (ii) motors controlling a direction and pitch, yaw, roll of a drone carrying the APD, (iii) radial servo or stepper motors that rotate an axis if the APD is in a fixed position or on a gimbal, and so on. For clarity, the motor controller 326 and the motors 328 are illustrated as being a part of the APD 180, but in alternative or additional implementations, the APD 180 communicates with motor controllers and/or motors external to the APD. To illustrate, the APD manager 320 communicates a position configuration to a motor controller that mechanically positions a platform or chassis that supports the APD 180. In aspects, the APD manager 320 communicates the position configuration to the motor controller using a local wireless link, such as Bluetooth™, Zigbee, IEEE 802.15.4, or a hardwire link. The motor controller then adjusts the platform based on the position configuration using one or more motors. The platform can correspond to, or be attached to, any suitable mechanism that supports rotational and/or linear adjustments, such as a drone, an aircraft, a non-stationary ground station (e.g., a vehicle-towable APD tower/module), a rail propulsion system, a hydraulic lift system, and so forth.

As shown in FIG. 3, a position of the APD 180 may be defined with respect to a three-dimensional coordinate system in which an X-axis 330, Y-axis 332, and Z-axis 334 define a spatial area and provide a framework for indicating a position configuration through rotational and/or linear adjustments. While these axes are generally labeled as the X-axis, Y-axis, and Z-axis, other frameworks can be utilized to indicate the position configuration (e.g., azimuth and elevation). To illustrate, aeronautical frameworks reference the axes as vertical (yaw), lateral (pitch), and longitudinal (roll) axes, while other movement frameworks reference the axes as vertical, sagittal, and frontal axes. As one example, position 336 generally points to a center position of the APD 180 that corresponds to a baseline position (e.g., position (0,0,0) using XYZ coordinates).

In aspects, the APD manager 320 communicates a rotational adjustment (e.g., rotational adjustments 338) around the X-axis 330 to the motor controller 326, where the rotational adjustment includes a rotational direction (e.g., clockwise or counterclockwise), an amount of rotation (e.g., degrees), and/or a rotation velocity. Alternatively or additionally, the APD manager 320 communicates a linear adjustment 340 along the X-axis, where the linear adjustment includes any combination of a direction, a velocity, and/or a distance of the adjustment. At times, the APD manager 320 communicates adjustments around the other axes as well, such as any combination of rotational adjustments 342 around the Y-axis 332, linear adjustments 344 along the Y-axis 332, rotational adjustments 346 around the Z-axis 334, and/or linear adjustments 348 along the Z-axis

334. Thus, the position configuration can include combinations of rotational and/or linear adjustments in all three degrees of spatial freedom, in addition to movement supported by a frame or platform (e.g., avionics drone or vehicle) to which an APD is mounted. This allows the APD manager 320 to communicate physical adjustments to the APD 180. Alternatively or additionally, the APD manager communicates RIS surface configurations, beam sweeping indices, and/or timing information as further described.

Figure 4:
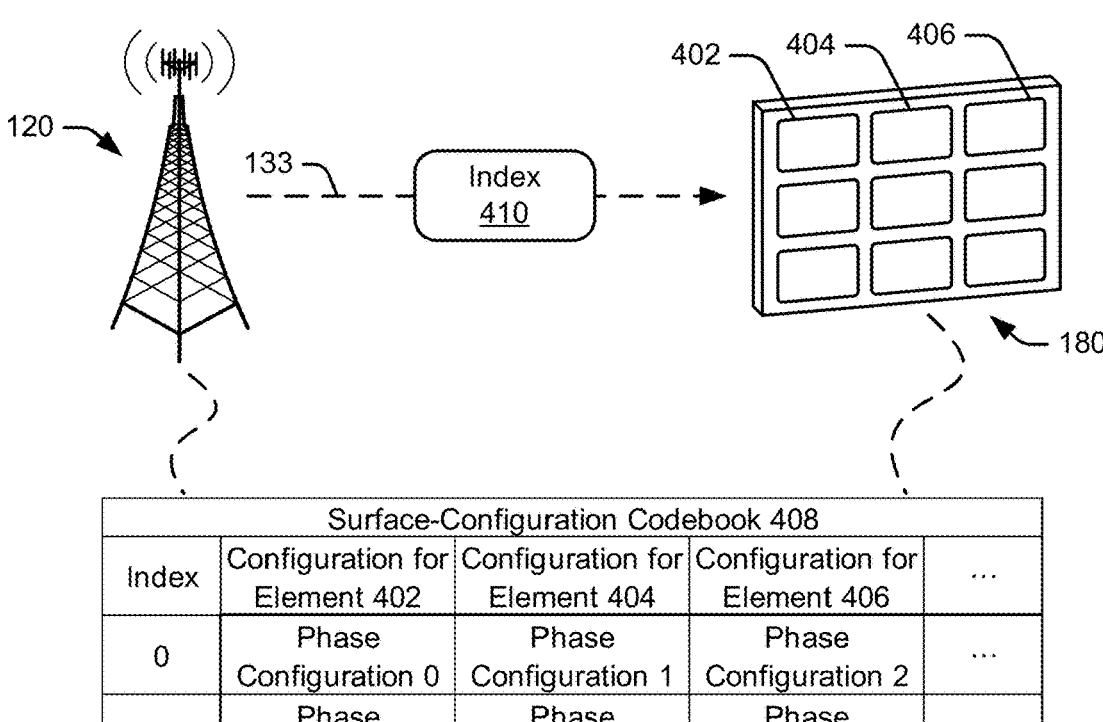
FIG. 4 illustrates an example of a base station configuring an APD in accordance with various aspects of MIMO transmissions using APDs.

FIG. 4 illustrates at 400 an example of a base station configuring an adaptive phase-changing device in accordance with various aspects. The example 400 includes instances of a base station 120 and an APD 180, which may be implemented similarly as described with reference to FIGS. 1-3. The RIS implemented by the APD 180 includes an array of "N" independently selectable and configurable surface elements, such as configurable surface element 402, configurable surface element 404, configurable surface element 406, surface partition, sub-panel, and so forth, where "N" represents the number of configurable surface elements of the RIS.

In implementations, the base station 120 or MIMO function 268 manages a configuration of the RIS of the APD 180 through use of a surface-configuration codebook 408, which can be preconfigured and/or known by both the base station 120 and the APD 180. Alternatively or additionally, the base station 120 may also manage a time-varying configuration of the RIS of the APD 180 through use of a beam sweeping codebook or beam sweeping index, such as described with reference to FIGS. 5A and 5B. In some cases, the base station 120 transmits a surface-configuration codebook 408 and/or a beam sweeping codebook using the wireless link 133, such as over an APD-slow-control channel using one or more messages. In aspects, the base station 120 uses the APD-slow-control channel to communicate large quantities of data, to communicate data without low-latency requirements, and/or to communicate data without timing requirements. At times, the base station 120 transmits multiple surface-configuration codebooks to the APD 180, such as a first surface-configuration codebook for downlink communications, a second surface-configuration codebook for uplink communications, a phase vector codebook, a beam sweeping codebook, timing advance information, or the like. In response, the APD 180 stores the surface-configuration codebook(s) 408 and/or other codebooks in CRM, which is representative of codebook(s) 316 in CRM 312 as described with reference to FIG. 3. Alternatively or additionally, the APD 180 obtains the surface-configuration and other codebooks through manufacturing (e.g., programming), calibration, or installation processes that store the surface-configuration codebook(s) 408 and other codebooks in the CRM 312 of the APD 180 during assembly, installation, calibration, verification, network association, or through an operator manually adding or updating the codebook(s).

The surface-configuration codebook 408 includes configuration information that specifies a surface configuration for some or all of the configurable surface elements (e.g., elements 324) forming the RIS of the APD 180. To illustrate, in some aspects, a phase vector defines a set of waveform transformation properties (e.g., phase delay, reflection angle/direction, polarization, amplitude) that a configurable surface element applies to an incident signal (e.g., incident waveform, incident signal ray) to transform the incident signal into a reflected signal (e.g., reflected waveform, reflected signal ray) characterized by one or more transformed properties. With respect to the surface-configuration codebook 408, each configuration entry may correspond to a phase vector and/or surface configuration associated with a set of waveform transformation properties provided by a respective configurable surface element of an APD when configured with the phase vector or surface configuration.

A surface configuration may include (or indicate) a surface element hardware configuration (e.g., for one or more PIN diodes) for each configurable surface element of the APD. In aspects, each surface element hardware configuration of a surface configuration may correspond to a respective entry in a phase vector. In other words, each surface element hardware configuration arranges the surface of a respective configurable surface element such that the respective configurable surface element transforms an incident waveform into a reflected waveform with waveform properties indicated by the corresponding phase vector entry. This can include absolute transformations based on the phase vector (e.g., generate a reflected waveform to within a threshold value/standard deviation of waveform properties indicated by the phase vector) or relative transformations (e.g., generate a reflected waveform based on modifying the incident waveform with the waveform properties indicated by the phase vector) to within a threshold value/standard deviation of the waveform properties.

As one example, each index of the codebook corresponds to a phase vector and configuration information for each configurable surface element of the APD 180. Index 0, for instance, maps phase configuration 0 to configurable surface element 402, phase configuration 1 to configurable surface element 404, phase configuration 2 to configurable surface element 406, and so forth. Similarly, index 1 maps phase configuration 3 to configurable surface element 402, phase configuration 4 to configurable surface element 404, phase configuration 5 to configurable surface element 406, and so forth. The surface-configuration codebook 408 can include any number of phase vectors that specify configurations for any number of configurable surface elements such that a first phase vector corresponds to a first surface configuration for the APD 180 (by way of configurations for each configurable surface element in the RIS), a second phase vector corresponds to a second surface configuration for the APD 180, etc. Alternatively or additionally, phase vectors or surface configurations of the surface-configuration codebook 408 may be mapped or calibrated to specific angle information of incident and/or reflective wireless signals (e.g., reference signals), signal rays, beamformed transmissions of the base station 120, beamformed transmissions of the UE 110, or the like. In various implementations, the base station 120 may use this angle information corresponding to the surface configuration or phase vector to compute the angular information used for determining a phase vector for the APD 180, a phase steering vector for the base station 120, or a phase steering vector for the UE 110 to implement MIMO transmissions using APDs.

While the surface-configuration codebook 408 of FIG. 4 includes phase vector information, alternative or additional codebooks may store beam configuration information, such as a first surface configuration that specifies a first beam with a first (propagation) direction, a second surface configuration that specifies a second beam with a second direction, etc. To illustrate, and similar to a phase vector surface configuration codebook, a beam codebook includes surface element hardware configurations that correspond to a respective beam configuration. In other words, each surface element hardware configuration arranges the surface of a respective configurable surface element such that the respective configurable surface element transforms an incident waveform into a reflected waveform with beam properties (e.g., direction) indicated in the beam-codebook. Thus, in various implementations, the surface-configuration codebook 408 corresponds to a beam-codebook. Similarly, to configure the surface of the APD 180, the base station determines the desired beam configuration for the transformed signal and identifies an entry in the beam-codebook corresponding to the desired beam configuration (e.g., by identifying a beam-codebook index that maps to the corresponding beam configuration or phase vector entry).

In some aspects, a phase-sweeping codebook indicates a pattern of surface configurations and/or beam configurations, such as surface configurations and/or beam configurations as indicated by the surface-configuration codebook 408 and beam configurations specified by the beam-codebook. To illustrate, the phase-sweeping codebook indicates an order of surface configurations to cycle through. Alternatively, or additionally, the phase-sweeping codebook indicates a time duration for applying each surface configuration. The surface-configuration information stored in a codebook can correspond to a full configuration that specifies an exact configuration (e.g., configure with this value) or a delta configuration that specifies a relative configuration (e.g., modify a current state by this value). In one or more implementations, the phase configuration information specifies a phase shift and/or phase adjustment between an incident signal and a transformed signal. For instance, the phase configuration 0 can specify a phase-shift configuration for element 404 such that the configurable surface element 404 transforms the incident waveform with a "phase configuration 0" relative phase shift.

In environment 400, the base station 120 communicates an indication 410 to the APD 180 that specifies a surface configuration. For example, the indication 410 specifies an index (e.g., index 410) that maps to a corresponding surface configuration, phase vector, or beam sweeping pattern in accordance with one or more aspects. In response to receiving the indication, the APD manager 320 retrieves the surface configuration, phase vector, or beam sweeping pattern from a corresponding codebook (e.g., surface-configuration codebook 408) using the index and applies the surface configuration(s) to the RIS (e.g., configuring each configurable surface element with the configuration and/or timing specified by the codebook).

In various implementations, the base station 120 communicates timing information (not shown) to the APD 180, which may be included with a surface configuration or beam sweeping index. For instance, a start time for the application of an indicated surface configuration or beam sweeping pattern. In aspects, the base station 120 communicates a stop time that indicates when to remove and/or change the surface configuration or beam sweeping pattern. Alternatively or additionally, the base station 120 communicates an APD timing adjustment (e.g., a timing advance, a timing delay) that indicates a relative adjustment to make. In some cases, timing information for a surface configuration or beam sweeping pattern includes a periodicity at which one or more different surface configurations are applied to one of the configurable surface elements of the APD 180. In changing the surface configuration, the APD 180, by way of the APD manager 320, can apply a default surface configuration, return to a previous surface configuration (e.g., a surface configuration used prior to the indicated surface configuration), and/or apply a new surface configuration to control a direction in which the APD 180 reflects wireless signals. To maintain synchronized timing among the base station 120, APDs 180, and/or the UEs 110 (e.g., for incident wireless signals of beam sweeping and/or MIMO transmissions), the APD 180 can receive and/or process a base station or network-based synchronizing signal (e.g., primary synchronization signal (PSS) or secondary synchronization signal (SSS) of an SSB).

By specifying the timing information, the base station 120 can synchronize and/or configure the APD 180 for use in a channel sounding process, a channel state information (CSI) process, and/or MIMO transmissions (e.g. coordinated uplink or downlink transmissions) with one or more UEs 110 in accordance with various aspects of MIMO transmissions using APDs. In some implementations, the base station 120 configures one or more APDs 180 with respective surface configurations and timing information (e.g., start times, stop times, and/or timing advance/delay for a time slot assigned to particular UE(s)) that correspond to MIMO transmissions to or from the UEs. In aspects, the base station 120 transmits surface-configuration indications and/or timing information using an APD-fast-control channel, which allows the base station 120 to dynamically configure the APD 180 on a slot-by-slot basis. For example, the base station 120 transmits a surface-configuration schedule to the APD that indicates when to apply different surface configurations to the RIS/configurable surface elements to support scheduled MIMO communications. Alternatively or additionally, the base station 120 communicates surface configuration changes on a slot-by-slot basis using signaling on the APD fast-control channel. These aspects of timing and control allow the base station to configure an APD to support MIMO transmissions for one or more UEs, such as in scenarios where different UEs are assigned same time slots or frequency resources, enable SU-MIMO transmissions for one UE, or enable MU-MIMO transmissions for multiple UEs, which can improve data rates, spectral efficiency, data throughput, or reliability for the multiple UEs and the corresponding wireless network.

MIMO Transmissions Using Adaptive Phase-Changing Devices

To facilitate MIMO communications at higher frequencies (e.g., at or above-6 GHz), a base station 120 may use one or more APDs 180 to mitigate LoS conditions or obstructions that impair communications between the base station 120 and one or more UEs 110. Before communicating through an APD-enabled communication path, the base station 120 or MIMO function 268 may characterize communication channels for at least one APD-enabled communication path and configure respective phase vectors and timing adjustments of the APD(s) 180 based on results of the channel characterization. Alternatively or additionally, the base station 120 (or MIMO function 268) may select one or more of the APDs 180 and/or one or more of the UEs 110 for MIMO transmissions based on the results (e.g., measurement reports) of the channel characterizations. To do so, the base station 120 may implement a downlink channel state information (CSI) process or direct the UEs 110 to implement an uplink sounding reference signal (SRS) process through channels or communication paths that include a respective APD 180. Generally, the base station 120 may associate (e.g., synchronize) respective resources of the uplink SRS process or the downlink CSI process with the implementation of phase vectors by the APD(s) to direct reflections of uplink sounding signals or downlink CSI signals to a receiving entity. By so doing, the base station 120 can select, based on signal quality parameters of reflections received by the base station or the UE, phase vectors and/or timing adjustments for the APD 180 to use when reflecting subsequent MIMO transmissions between the base station and one or more UEs. Alternatively or additionally, the base station 120 may use information of the channel characterization processes to select or group combinations of APDs and/or UEs for various downlink or uplink SU-MIMO transmissions or MU-MIMO transmissions.

FIGS. 5A-9 illustrate various examples of a base station communicating with one or more UEs through the use of respective APDs in accordance with one or more aspects of MIMO transmissions using APDs. The described examples of FIGS. 5A and 5B include using APDs to reflect downlink reference signals to respective UEs as part of a downlink channel characterization process (e.g., CSI procedure) or using APDs to reflect respective uplink reference signals to a base station as part of an uplink channel characterization process (e.g., SRS procedure). Based on results of a channel characterization process, a base station may select and configure different combinations of APDs and UEs to implement various scenarios of MIMO transmissions using APDs in accordance with one or more aspects. As described with reference to FIG. 6, the base station may implement MU-MIMO transmissions with multiple UEs using multiple respective APDs. Alternatively, the base station may implement SU-MIMO transmissions with a single UE using multiple APDs as described with reference to FIG. 7. Other examples include the base station implementing MU-MIMO transmissions with multiple UEs using respective panel partitions of a single APD as described with reference to FIG. 8 or implementing SU-MIMO transmissions with a single UE using multiple panel partitions of an APD as described with reference to FIG. 9.

Aspects described with reference to one example may be combined with other examples, transactions of FIGS. 10 and 11, or methods of FIG. 12 to implement operations for MIMO transmissions using APDs in various ways or scenarios. For example, a base station or MIMO function 268 may configure UEs and APDs to implement beam sweeping of respective patterns of beams and reflections of uplink reference signals to generate channel measurements that enable selection of a combination of UE beams/steering vectors, APD phase vectors, or respective timing adjustments to use for uplink MIMO transmissions. Alternatively, the base station may configure the APDs to implement beam sweeping of respective patterns of reflections of downlink reference signals to generate channel measurements that enable selection of a combination of BS beams/steering vectors, APD phase vectors, or respective timing adjustments to use for downlink MIMO transmissions. In aspects, the base station may apply the theorem of reciprocity to use results from a downlink channel characterization or MIMO transmissions to select configurations for an APD and a UE to implement uplink MIMO transmissions and vice versa. Thus, implementing bi-directional channel characterization processes for respective downlink or uplink MIMO transmissions may be optional when the reciprocity theorem can be applied to previously determined channel measurements or communication path data for a reverse link direction.

Figure 5B:
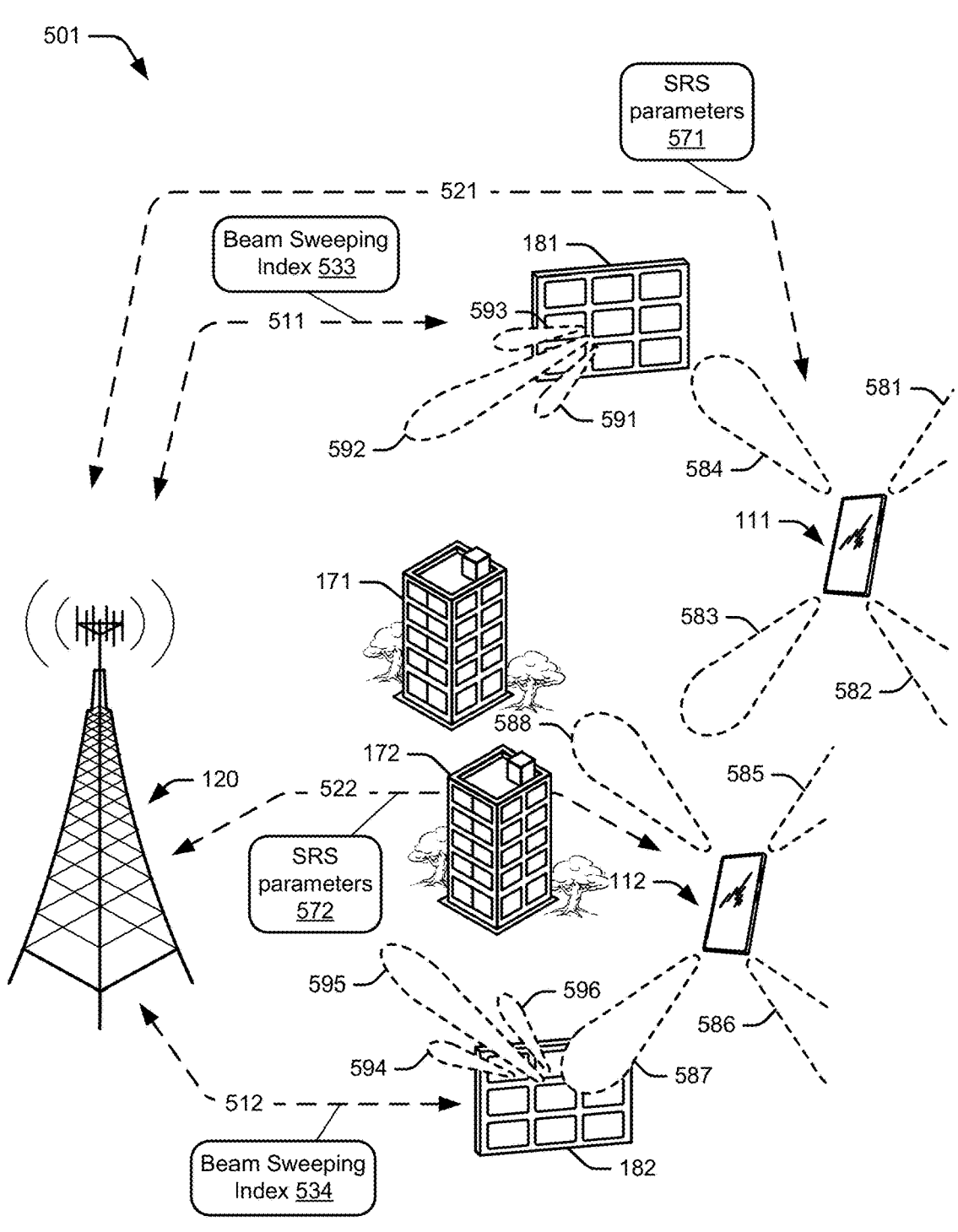

FIGS. 5A and 5B illustrate examples of channel characterization processes that a base station or MIMO function 268 can implement in accordance with one or more aspects of MIMO transmissions using APDs. In aspects, a base station may implement various operations, configurations, or channel measurements described with reference to the examples of FIG. 5A or 5B to perform channel characterization processes (e.g., APD-enabled CSI or SRS procedures) useful to enable MIMO transmissions using APDs. Although illustrated in the context of two APDs 180 and two UEs 110, the described examples may be applied to any suitable communication scenario, which may include a single APD with multiple UEs, multiple APDs with a single UE, multiple APDs with multiple UEs, and/or with transitions between the described configurations or scenarios based on results or measurements of the processes. In other words, the base station may adapt to dynamic channel conditions or UE movement by re-selecting or re-grouping APDs and/or UEs to implement MIMO transmissions.

FIG. 5A illustrates at 500 an example of a base station implementing a downlink channel characterization process that can be used to implement various aspects of MIMO transmissions using APDs. The downlink (DL) channel characterization process may include a CSI-reference signal (CSI-RS) process that provides the base station with information useful to calculate DL MIMO transmission configurations (e.g., phase vectors and timing adjustment) or calculate reciprocal and/or timing information for uplink (UL) MIMO transmissions. Generally, the example 500 includes a base station 120 using APDs 181 and 182 to direct, steer, or sweep reflected beams of respective DL wireless reference signals transmitted by the base station 120 toward UEs 111 and/or 112. The described DL channel characterization process may be implemented concurrently with respective APDs and reference signal receiving-UEs or sequentially with an APD and one or more reference signal receiving-UEs. In aspects, the base station may implement the DL channel characterization process to enable MU-MIMO communications with multiple UEs or SU-MIMO with a single UE.

As shown in FIG. 5A, the base station 120 can use the APDs 181 and 182 to reflect the beams of downlink wireless signals (e.g., above-6 GHz signals) around obstructions 171 or 172 that block LoS communication paths between the base station and the UE 111 and 112. Here, note that UEs 111 and 112 may be positioned at different distances from the base station 120, with UE 111 being positioned further away than UE 112. In this example, UE 112 is positioned closer to the base station than UE 111 (e.g., three quarters of the distance of UE 111) but without an LoS communication path. As such, lengths of respective LoS and non-LoS communication paths between the base station and each UE are different, resulting in different propagation delays (e.g., one-way or roundtrip) through the channels of each communication path. In aspects, the base station 120 or MIMO function 268 may calculate respective timing adjustments (e.g., in addition to timing advances (TAs)) for base station-originating downlinks (e.g. DL MIMO transmissions), phase vectors of the APDs 180 (e.g., reflections of DL or UL MIMO transmission), and/or UE-originating uplinks 110 (e.g., UL MIMO transmissions) to account for these different or varying propagation delays such that MIMO transmissions arrive at a receiving device (e.g., base station or UE in SU-MIMO mode) within an amount of time (e.g., a cyclic prefix) sufficient to enable decoding of received MIMO transmissions.

In aspects, the base station 120 may determine to use an APD or establish an APD-enabled communication path to communicate with a respective UE in response to detecting an obstruction or deteriorating channel conditions in a communication path (e.g., LoS or non-LoS path). For example, the base station may detect an obstruction or impaired channel conditions when a link signal quality or signal strength of received UE-originating transmissions falls below a threshold. These conditions may occur or result from UE movement, APD-movement, movement of temporary obstructions (e.g., foliage or vehicles), atmospheric changes (e.g., fog, rain, or water vapor), or the like. In some cases, the base station may determine to add an APD-enabled communication path in response to a data rate or throughput with a UE falling below a threshold. By so doing, the base station can mitigate such communication issues by enabling MIMO transmissions that utilize the APD-enabled communication path to increase communication performance.

As part of a downlink or uplink channel characterization process, the base station 120 may select one or more APDs 180 (e.g., a candidate APD) to evaluate for use in a communication path or to provide an APD-enabled communication path with a UE 110. Generally, the base station 120 (e.g., a terrestrial or non-terrestrial base station or radio head) has a known position from which the base station 120 manages or coordinates respective channel characterization processes or MIMO transmissions of various entities. Oftentimes the APD 180 also has a known position, which may include a location of the APD 180 (e.g., relative to the base station 120) and an orientation of a surface of the APD 180. For example, the APD 180 may have a fixed location that is set at a time of installation or determined by a position sensor 308 (GNSS receiver) of the APD 180. In aspects, the base station 120 or MIMO function 268 obtains position and/or orientation information from the APD 180 via an APD control channel (e.g., APD control channel 511, APD control channel 512), which may include the APD-slow-control channel or APD-fast-control channel implemented via the wireless link 133 or the wireless link 134. In this example, APD control channels are implemented as separate APD control channels 511 and 512 between the base station 120 and the APDs 181 and 182. Although shown as separate APD control channels, the base station 120 may communicate with both APD 181 and APD 182 using a same wide beam communications or different narrow beam communications. Alternatively or additionally, the base station 120 can query a server for position information and/or capabilities of APDs 180 proximate the base station 120 or UE 110, such as by contacting a server included in the core network 150 of FIG. 1.

Based on the position information of one or more APDs 180, the base station 120 can select APDs 180 to use for MIMO transmissions with the UE 110s. For example, the base station 120 may select an APD 180 that is near the UE 110 (e.g., UE's estimated position), an APD 180 located near an LoS communication path between the base station and the UE, or an APD 180 that is likely to provide an APD-enabled communication path between the base station and the UE (e.g., based on historical records or recent APD activity). Alternatively or additionally, the base station 120 may estimate or receive a position of the UE 110, such as through low-band connection 521 or low-band connection 522 (e.g., GNSS-based UE-position or base station-UE low-band signaling). In aspects, the base station 120 may select and/or configure an APD 180 to participate in a channel characterization process and/or MIMO transmissions based on the position of the APD 180 (e.g., location and orientation) and/or the estimated position of the UE.

In the context of the example 500, the base station 120 selects APDs 181 and 182 to use for communications with the UEs 111 and 112 based on a respective proximity of the APDs with the UEs. To implement a downlink channel characterization of communication paths that include the APDs 181 and 182, the base station 120 may associate or bind resources of a downlink CSI process or synchronization process (e.g., specific beam) with one or more corresponding phase vectors of an APD 180 and downlink reference signal identifiers. These identifiers (IDs) may include BS-modulated signal IDs or APD-modulated reflection IDs, which provide indexed CSI downlink reference signals and/or reflections thereof. For example, the base station 120 can define a CSI process for a specific APD by associating parameters of the CSI-RSs with corresponding configurations settings of the APD. In aspects, a base station defined CSI process may include an antenna port, precoding matrix, beam identifier (beam ID), BS-modulated signal ID of a CSI-RS that is bound or associated with an APD index (APD ID) and phase vector (e.g., of a beam sweeping pattern) of the APD with which the CSI process is implemented. In some cases, the base station may associate, assign, or map a surface configuration of the APD to a respective APD phase vector or surface configuration of a beam sweeping pattern implemented by the APD during the channel characterization process.

Alternatively or additionally, the APD may modulate reflections of the reference signals with identifiers associated with a reference signal index, air interface resources of reference signals, or APD phase vector to enable analysis of reflections by a receiving device. In such cases, phase vectors of a beam sweeping pattern may be associated with or mapped to the APD-modulated reflection identifiers. By so doing, a UE 110 can identify and measure signal quality parameters for reflections (e.g., reflection 552 or reflection 554) or LoS downlink reference signals that reach a UE, which in turn provides information (e.g., CSI) to the base station via a downlink (DL) signal report (e.g. DL signal report 561 or 562) for analysis of the downlink beams (e.g., downlink beams 541 or 542) and APD vectors. Based on the analysis of the signal reports, the base station can determine which combination of downlink beam(s), timing information, and/or APD vector(s) enable a communication path for MIMO communications between the base station and one or more UEs.

In the example 500, the base station 120 defines respective CSI processes for the APDs 181 and 182 by associating respective identifiers, resources, or parameters of CSI-RSs to a respective surface configuration or phase vector of a beam sweeping pattern selected for each of the APDs. The base station may select the surface configuration, phase vector, or beam sweeping pattern based on a position of the APD relative to the base station and an estimated position of a UE 110 (e.g., UE 111 or UE 112). The base station 120 then transmits respective beam sweeping indices 531 and 532 to the APDs 181 and 182 via APD control channel 511 and APD control channel 512 (e.g., separate low-band control channels). The base station 120 may also send timing information to the APDs 181 and/or 182 for implementing the phase vectors of the beam sweeping patterns in synchronization with downlink reference signals. To implement the CSI process and with reference to APD 181, the base station 120 directs the APD to apply the phase vectors of the beam sweeping pattern while the base station transmits a downlink beam 541 of CSI-RSs toward the RIS 322 of the APD 181. This results in a sweep of reflection beams 551, 552, and 553 from the APD 181 toward the UE 111, some of which may also reach the UE 112. The base station 120 may perform similar operations for APD 182, including transmitting a downlink beam 542 toward the RIS 322 of the APD 182 while the APD implements phase vectors of its beam sweeping pattern to direct reflection beams 554, 555, and 556 toward the UE 112, some of which may reach UE 111. Thus, in some cases, the UE 111 may receive APD-reflected signals from more than one APD, which in the context of FIG. 5A may include reflected beam 554 or 555 from APD 182, as well as reflected beams 552 and 551.

Based on various combinations of the downlink beams 541, 542 and phase vectors implemented by the respective APDs during the CSI process, the UEs 111 and 112 may receive one or more reflections of the downlink reference signals from either or both APDs. For example, the UE 111 may receive reflections from APD 181 as part of a first CSI process and from APD 182 as part of a second CSI process, which may be implemented concurrently or sequentially with respect to the first process. Generally, a UE 110 may generate a downlink signal report (e.g., DL signal report 561 or 562) based on the received reflections of reference signals from one or more APDs that enable the base station 120 to identify and/or analyze channel state information that corresponds to respective combinations of downlink beams and APD phase vectors that provide reflections that reach the UE. The downlink signal report may include signal or link quality measurements for signals received by a UE, which may include directly received downlink signals or reflections of downlink signals. For example, the UE may decode identifiers of received reflections or collect information (e.g., antenna port, precoding matrix, air interface resources) useful to the base station for identifying a CSI index (e.g., DL beam and/or APD phase vector) of the reflections that reach the UE. Additionally, the downlink signal report may include timing information (e.g., time of arrival) useful to determine a propagation delay between the base station and UE, or respective legs of propagation delay between the base station and APD (BS-to-APD propagation delay) and between the APD the UE (APD-to-UE propagation delay).

In aspects, one or more of the UEs 110 provides a DL signal report indicative of at least one CSI-RS index (e.g., a highest reference signal receive-power (RSRP), reference signal receive-quality (RSRQ), signal-to-noise ratio (SNR), signal-to-interference-plus-noise ratio (SINR), or CSI-RS indices prioritized by signal strength/quality) to the base station through the low-band connection 521 or the low-band connection 522. Based on the DL signal report, the base station can determine a respective APD ID and phase vector for reflections that reach the UE. Concluding the present example, the UE 111 and UE 112 generate DL signal report 561 and DL signal report 562 for the reflections of downlink reference signals received from the APD 181 and/or APD 182 as part of the respective CSI processes. The UE 111 then transmits the DL signal report 561 to the base station through the low-band connection 521 and UE 112 transmits the DL signal report 562 to the base station through the low-band connections 522. In some implementations, the DL signal reports 561 and/or 562 include respective CSI-RS indices and signal quality measurements for one or more reflections received by one of the UEs 110 from APD 181 and/or APD 182. Based on the results of the downlink channel characterization or CSI process, the base station 120 may analyze the signal reports to determine respective MIMO transmission configurations for the base station, one or more APDs, and/or one or more UEs, examples of which are described with reference to FIGS. 6-9, the transactions of FIGS. 10 and 11, or the methods of FIG. 12.

FIG. 5B illustrates at 501 an example of a base station implementing an uplink channel characterization process that can be used to implement various aspects of MIMO transmissions using APDs. The uplink (UL) channel characterization process may include an SRS process that provides the base station with information useful to calculate UL MIMO transmission configurations (e.g., phase vectors and timing adjustment) or calculate reciprocal configurations for downlink (DL) MIMO transmissions. Generally, the example 501 includes a base station 120 using APDs 181 and 182 to direct, steer, or sweep beams of respective UL wireless reference signals transmitted by the UE 111 and/or UE 112. Note that due to the unknown spatial orientation of a UE 110 with respect to the APDs or base station, the UE may implement multiple iterations of broad to narrow uplink beam sweeps to refine transmissions directed toward an APD. The described UL channel characterization process may be implemented concurrently with respective APDs and reference signal transmitting-UEs or sequentially with an APD and one or more reference signal transmitting-UEs. The base station may implement the UL channel characterization process to enable MU-MIMO communications with multiple UEs or SU-MIMO with a single UE. For descriptive brevity, the entities of FIG. 5B may be positioned, communicate, and implement aspects of uplink channel characterization similarly or reciprocally to the positioning (e.g., distance, propagation delay, obstructions, APD selection, etc.), communications, and aspects of downlink channel characterization as described with reference to FIG. 5A.

In aspects, uplink operations may leverage downlink characterization or performance measurements, or implement an uplink channel characterization process to use directional SRSs to find viable uplink APDs and respective APD configurations (e.g., phase vectors) for MIMO transmissions. Additionally, the base station 120 may determine uplink timing advance information that includes a timing advance command or parameter, which may account for different propagation distances through different APD-enabled communication paths. In some cases, timing information determined by the base station includes a first timing advance (TA) value for a UE to apply to an initial UL transmission and a second timing advance value for an APD to apply with respect to when a phase vector is applied to reflect the UL transmission such that respective reflections of UL signals from the different UEs (or a same UE for SU mode) arrive at the base station at a same time (e.g., within one cyclic prefix) for proper MU-MIMO reception by the base station.

In the context of the example 501, the base station 120 selects APDs 181 and 182 as candidate APDs to use for communications with the UEs 111 and 112 based on respective proximity of the APDs with the UEs or historical records indicating viable APD-enabled communication paths provided by the APD 181 or APD 182. To enable an uplink channel characterization of communication paths that include the APDs 181 and 182, the base station 120 may associate or bind resources (e.g., SRS parameters 571, 572) of an uplink SRS process implemented by a UE with one or more corresponding phase vectors of one or more APDs 180 and uplink reference signal identifiers (e.g., signal or reflection identifiers). This may provide indexed SRS uplink reference signals and/or reflections thereof useful for selecting or configuring APDs for MIMO transmissions. For example, the base station 120 defines an SRS process for a specific APD by associating parameters of the SRSs with configurations settings of the APD (e.g., phase vectors and beam sweeping timing parameters). In aspects, a base station defined SRS process may include an antenna port, precoding matrix, beam identifier (beam ID), UE-modulated signal ID of an SRS that is bound or associated with an APD index (APD ID), and/or a phase vector (e.g., of a beam sweeping index) of the APD with which the SRS process is implemented. In some cases, the base station may associate, assign, or map a surface configuration of the APD to a respective APD phase vector or surface configuration implemented by the APD during the channel characterization process. By so doing, the base station may select the surface configuration for MIMO transmission based on APD phase vector surface configuration that yields the highest uplink signal metrics (e.g., RSRP, SNR) during the channel characterization process.

Alternatively or additionally, the APD may modulate reflections of the reference signals with identifiers associated with a reference signal or APD phase vector to enable analysis of reflections by a receiving device. In such cases, phase vectors of a beam sweeping pattern may be associated with or mapped to the APD-modulated reflection identifiers. By so doing, a BS 120 can identify and measure signal quality parameters for reflections or LoS uplink reference signals that reach a base station to provide uplink signal metrics (e.g., uplink signal report) for the uplink channel characterization process. Based on the analysis of uplink signal metrics or reports, the base station can determine which combination of uplink beam(s) 580, timing information, and/or APD phase vector enable a communication path for MIMO communications between the base station and one or more UEs.

In the example 501, the base station 120 defines respective SRS processes for the APDs 181 and 182 by associating respective identifiers, resources, or parameters of SRSs to a respective surface configuration or phase vector of a beam sweeping pattern selected for the APDs. To configure the UEs 111 and 112 for the SRS process, the base station 120 transmits SRS parameters 571 to the UE 111 using the low-band connection 521 and transmits SRS parameters 572 to the UE 112 using the low-band connection 522. The base station may select the surface configuration, phase vector, or beam sweeping pattern based on a position of the APD relative to the base station and an estimated position of a respective one of UE 111 or UE 112. The base station 120 then transmits respective beam sweeping indices 533 and 534 to the APDs 181 and 182 via APD control channels 511 and 512 (e.g., separate low-band control channels). The base station 120 may also send timing information to the APDs 181 and/or 182 for implementing the phase vectors of the beam sweeping patterns in synchronization with transmission of SRSs by the UEs 111 and 112.

To implement the SRS process and with reference to APD 181, the base station 120 directs the APD to apply the phase vectors of the beam sweeping pattern while the UE 111 transmits uplink beams 581, 582, 583, and 584 of SRSs in accordance with the SRS parameters 571, with uplink beam 584 reaching the RIS 322 of the APD 181. This results in a sweep of reflection beams 591, 592, and 593 from the APD 181 toward the base station. Note that uplink beam 583 may also reach APD 182, which may also implement a concurrent beam sweep pattern, resulting in a sweep of reflection beams similar to those shown as beams 594, 595, and 596. Thus, reflections of SRSs transmitted by the UE 111 may reach the base station from one or both APDs 181 and 182 enabling the base station to configure multiple APD-enabled communication paths to the UE. The base station 120 may perform similar operations for APD 182, including directing the UE 112 to transmit uplink beams 585, 586, 587, and 588, with uplink beam 587 reaching the RIS 322 of the APD 182 while the APD implements phase vectors of its beam sweeping pattern. This may direct reflection beams 594, 595, and 596 toward the base station for reception and subsequent measurement to provide uplink signal metrics. Similar to the SRS process of UE 111, an uplink beam of UE 112 may reach APD 181 resulting in other reflections of uplink beams that may reach the base station (e.g., UL from UE 112 to APD 181 to base station 120), enabling the base station to configure multiple APD-enabled communication paths to the UE 112.

In aspects, the base station may associate the SRSs from different UEs (e.g., 111, 112) with a corresponding APD index (or APD identifier). For example, base station 120 can command the UEs 111 and 112 to sweep respective SRS signals and detect which APD (with the corresponding index) yields a highest SNR or RSRP on reception by the base station. The base station may then associate the received SRSs with the respective specific APD index or identifier (e.g., an SRS of UE 111 has a highest SNR reflected from APD 181) with the highest SNR or RSRP. Based on the association of SRS measurements and APD indices, the base station can schedule, for MU-MIMO, two UEs together with different APDs having the associated index.

Generally, the base station 120 may receive one or more reflections of the uplink reference signals from either or both APDs based on various combinations of the uplink beams (e.g., 583, 584, 587, and 588) and phase vectors implemented by the respective APDs during the SRS processes. For example, the base station may receive reflections from APD 181 (e.g., uplink beam 583) as part of a first SRS process with UE 111 and from APD 182 (e.g., uplink beam 588) as part of a second SRS process with UE 112, which may be implemented concurrently with or sequentially with respect to the first process. Generally, the base station 120 may generate an uplink signal report (not shown) based on the received reflections of reference signals from one or more APDs that enable the base station 120 to identify and/or analyze channel state information of combinations uplink beams and APD phase vectors that provide reflections that reach the base station. The uplink signal report may include signal or link quality measurements for signals received by the base station, which may include directly received uplink signals or reflections of uplink signals. For example, the base station may decode identifiers of received reflections or access information (e.g., antenna port, precoding matrix, air interface resources) useful to the base station for identifying an SRS index (e.g., UL beam and/or APD phase vector) of reflections that reach the base station. Additionally, the uplink signal report may include timing information (e.g., time of arrival) useful to determine a propagation delay between the UE and base station, or respective legs of propagation delay between the UE and APD and between the APD the base station.

In aspects, the base station determines a UL signal report indicative of at least one SRS index (e.g., a highest RSRP, SRS indices prioritized by signal strength) by which the base station can determine an APD ID and phase vector for a respective reflection that reaches the base station. Concluding the present example, the base station 120 generates a UL signal report (not shown) for the reflections of uplink reference signals received from the APD 181 and/or APD 182 as part of the respective SRS processes implemented by UE 111 and UE 112. In some implementations, the UL signal report includes respective SRS indices and signal quality measurements for one or more reflections received by the base station from APD 181 and/or APD 182. Based on the results of the uplink channel characterization, the base station 120 may analyze the signal reports to determine respective MIMO transmission configurations for the base station, one or more APDs, and/or one or more UEs, examples of which are described with reference to FIGS. 6-9, the transactions of FIGS. 10 and 11, or the methods of FIG. 12.

FIGS. 6-9 illustrate various examples of a base station communicating with one or more UEs through the use of respective APDs in accordance with various aspects of MIMO transmissions using APDs. A base station 120 may implement aspects of the described examples based on results of one or more channel characterization processes or apply the theorem of reciprocity to use results from a channel characterization process to communicate in a reverse link direction (e.g., use uplink results for implementing downlink aspects in TDD schemes or in close or adjacent FDD bands). Generally, the examples of FIGS. 6-9 may include selecting and grouping combinations of APDs and UEs for MIMO communications, determining respective MIMO configurations for the APDs and UEs, sending various parameters of the MIMO configurations to the APDs and UEs, and implementing MIMO transmissions through communication paths enabled by the configured APDs and UEs. These non-limiting examples include implementing MU-MIMO transmissions with multiple UEs using respective APDs (FIG. 6), implementing SU-MIMO transmissions with a single UE and multiple APDs (FIG. 7), implementing MU-MIMO transmissions with multiple UEs using respective panel partitions of a single APD (e.g., FIG. 8), and implementing SU-MIMO transmissions with a single UE using multiple panel partitions of an APD (e.g., FIG. 9). Aspects described with reference to one example may be combined with other examples, transactions of FIGS. 10 and 11, or methods of FIG. 12 to implement operations for MIMO transmissions using APDs in various ways or scenarios.

In various aspects, the base station 120 uses results from a channel characterization process to select, group, and/or schedule one or more UEs and one or more APDs to implement MU-MIMO or SU-MIMO communications. In the context of FIG. 5A, 5B, or 6-9, a UE (e.g., UE 111, UE 112) may feedback at least one CSI-RS index (e.g., with highest signal strength or prioritized by signal strength) to the base station 120 indicating an associated APD index (or identifier) and phase vector. Alternatively, the base station may receive respective SRSs from UEs with indications useful to identify an APD index and phase vector by which a reflection of an SRS reaches the base station. In aspects, the base station may use the CSI feedback (or SRS measurements) to determine APDs and phase vectors that enable communication paths for MIMO transmissions with APDs. For example, UE 111 could feedback its top three CSI-RS indices as APD 181 with phase vector 1, APD 181 with phase vector 2, and APD 182 with phase vector 3. Similarly, UE 112 could feedback its top CSI-RS indices as APD 182 with phase vector 4. Based on these channel characterization results (or similar SRS measurements), the base station 120 can select APD 181 with phase vector 1 for UE 111 and APD 182 with phase vector 4 for UE 112 and implement MU-MIMO accordingly (e.g., FIG. 6). In other cases, if there is only one UE or the base station fails to receive feedback from a second UE (or receives SRSs from one UE), the base station can select to implement SU-MIMO with UE 111 by using APD 181 with phase vector 1 and APD 182 with phase vector 3 (e.g., FIG. 7).

Alternatively or additionally, the base station can associate UEs in MU-MIMO scheduling where the CSI process selected by a UE corresponds to a particular APD index. For example, UE 111 may receive reflected CSI-RS signals from both APD 181 and 182 and report back to the base station the CSI-RS index (e.g., CSI-RS and associated APD index) that corresponds to the APD through which CSI-RS signals are received with better signal strength. The base station 120 can then pair or group the UEs together for MU-MIMO scheduling based on the respective CSI feedback provided by the UEs that correspond to different APD indices. When a UE receives CSI-RS signals from the base station via multiple APDs, the base station can schedule that UE for SU-MIMO. To facilitate MIMO transmissions, the base station can determine MIMO transmission configurations for the APDs and/or UEs. The base station can send parameters of the MIMO transmission configurations to the APDs or UEs through APD control channels and low-band connections, respectively. When configured in accordance with the determined MIMO transmission configurations, the base station may then implement downlink or uplink MIMO transmissions as described herein. These and other examples of APD-enabled MIMO communication are described with reference to the examples of FIGS. 6-9, transactions of FIGS. 10 and 11, and the methods of FIG. 12.

Figure 6:
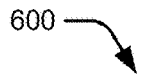
FIG. 6 illustrates an example of using multiple APDs for MIMO transmissions with multiple user equipment in accordance with one or more aspects.

FIG. 6 illustrates at 600 an example of using multiple APDs for MU-MIMO transmissions with multiple UEs in accordance with one or more aspects. An environment of the example 600 includes the base station 120, the APD 181, the APD 182, the UE 111, and the UE 112 of FIG. 1, which may communicate as described with reference to FIGS. 1-5B. As shown in FIG. 6, and in a similar manner to that described with reference to the wireless link 130 of FIG. 1, the base station 120 may communicate with the UE 111 using a low-band connection 521 (e.g., below 6 GHz, sub-6 GHz) and/or a high-band connection 621 (e.g., above 6 GHz) that includes an RIS 322 of the APD 181. The base station may also communicate with the UE 112 using a low-band connection 522 and/or a high-band connection 622 that includes an RIS 322 of the APD 182. In this example, the base station 120 may implement downlink and/or uplink MU-MIMO transmissions with the UE 111 and UE 112 through the high-band connections 621 and 622. In aspects, the base station may determine to use APD-enabled communication paths or implement MIMO transmissions with APDs in response to an unsuccessful attempt to establish high-band communications through LoS communication path or may analyze the signal- and/or link-quality measurements and detect a channel impairment or detect that the signal- and/or link-quality measurements are trending to fall below an acceptable performance level. To configure and direct the application of downlink or uplink phase vectors, the base station can communicate with multiple APDs 180 using a wide-beam low-band APD control channel or communicate with multiple APDs 180 using respective narrow-beam or wired APD control channels 511 and 512.

To enable the MU-MIMO transmissions shown in FIG. 6, the base station 120 may select a group of candidate APDs 180 that include APD 181 and 182 and implement a channel characterization process as described with reference to FIGS. 5A, 5B, 10, 11, and/or 12 to obtain uplink or downlink signal reports (e.g., signaling metrics). Based on the uplink and/or downlink signal reports, the base station 120 selects multiple UEs with which to implement MIMO transmissions. Here, assume that CSI-RS indices provided by UE 111 indicate that phase vector 7 of the APD 181 provided a highest RSRP value and that CSI-RS indices of UE 112 indicate that phase vector 24 of the APD 182 provided a highest SNR value. Accordingly, the base station 120 pairs UE 111 with APD 181 and pairs UE 112 with APD 182 for scheduling MU-MIMO transmissions through the respective communication paths illustrated in FIG. 6.

In aspects, the base station 120 or MIMO function 268 determines a MIMO transmission configuration for selected APDs and/or UEs based on the channel characterization process. The base station may determine or generate a MIMO transmission configuration that includes one or more of a transmit beam configuration (e.g., beam ID or precoding matrix), an APD surface configuration, an APD timing advance, a UE timing advance, and so forth. For example, the base station may analyze signal or link quality measurements of the uplink or downlink signal reports generated by the channel characterization process. Based on the analysis, the base station can select respective surface configurations for the APDs, which may include the APD phase vectors that result in a highest signal power or signal quality value at the base station (e.g., SRS) or the UE (e.g., CSI-RS). The base station may generate separate MIMO transmission configurations for downlink and uplink transmissions or generate a combined MIMO transmission configuration that includes parameters to enable MIMO transmissions in either link direction.

In some implementations, as part of a channel characterization process, the base station may assign respective MIMO transmission configurations to respective surface configurations included in a beam-sweeping pattern of the APD. To configure the APD, the base station can then identify a MIMO transmission configuration for MIMO transmissions based on the channel characterization process and the assigned APD phase vector that results in the highest or strongest signal metrics for reflections that reach a UE or the base station during channel characterization. Alternatively or additionally, the base station can determine respective timing advance values for the application of phase vectors by an APD or uplink transmissions of a UE based on respective positions of the APDs and the UEs and subframe or slot timing of a shared physical channel (e.g., physical downlink shared channel (PDSCH) or physical uplink shared channel (PUSCH)) for which the MIMO transmissions are scheduled. By so doing, the base station 120 may account for different amounts of propagation delay (or distances) through APD-enabled communication paths to coordinate the arrival of MIMO transmissions at a receiver within an amount of time (e.g., cyclic prefix) sufficient to enable decoding of the received transmissions.

Returning to FIG. 6, the base station 120 identifies a MIMO transmission configuration for downlink transmissions to the UE 111 and UE 112 that includes surface configurations for APD 181 and 182 based on results of the channel characterization process. In this example, the base station determines a surface configuration 611 for APD 181 and a surface configuration 612 for APD 182. Based on the previously mentioned channel characterization process results, the surface configuration 611 can include an indication of the phase vector 7 for APD 181 and an APD timing advance (TA) value based on the propagation delay between the base station and APD 181. The surface configuration 612 can include an indication of the phase vector 24 for APD 182 and another APD TA value based on the propagation delay between the base station and APD 182. In some cases, a surface configuration of an APD may also include a reference or indication to a slot or subframe of a physical shared channel for which the MIMO transmissions are scheduled by the base station. Note that the environment of FIG. 6 is not shown to scale and the APD 181 may be located much further from the base station than APD 182. As such, the APD TA value for APD 181 may be much larger than the APD TA value for APD 182 or other APDs 180 near the base station.

Alternatively or additionally, the base station can identify a MIMO transmission configuration for UE uplink transmissions that may include surface configurations and UE timing advance values based on results of the channel characterization process. Based on the theorem of reciprocity, the uplink surface configurations 611 and 612 may use the same phase vectors as the downlink configurations (or vice versa) with same timing advance values (e.g., similar path distances) or different timing advance values. For example, the base station may determine a UE timing advance based on a total path length or propagation delay and determine an (uplink) APD timing advance based on the path length or propagation delay between the UE and the APD. As such, the MIMO transmission configuration for a communication path may include a UE TA value and surface configuration having an indication of a phase vector and uplink APD TA value. As noted, the downlink APD TA value and uplink APD TA value may include different amounts of time, such as when the APD is not equidistant from the base station and UE.

Continuing the ongoing example, the base station 120 generates or updates the MIMO transmission configuration with uplink parameters for the surface configuration 611 for APD 181, the surface configuration 612 for APD 182, a UE TA value for UE 111, and a UE TA value for UE 112. With reference to uplink transmissions, the surface configuration 611 may include the indication of the phase vector 7 for APD 181 and an APD TA value based on the propagation delay between the UE 111 and APD 181. The surface configuration 612 may include the indication of phase vector 24 for APD 182 and another APD TA value based on the propagation delay between the UE 112 and APD 182. The base station can configure the uplink APD TA values to direct the APDs to apply respective surface configurations at a time that coincides with arrival of the uplink transmissions by the corresponding UEs resulting in reflection of the uplink MIMO transmissions to the base station. For the UEs 111 and 112, the base station determines a UE TA value 631 for UE 111 based on the propagation delay between the UE 111 and the base station and a UE TA value 632 for UE 112 based on the propagation delay between the UE 112 and the base station. The base station may configure the UE TA values 631 and 632 such that uplink MIMO transmissions reach the base station within a time window (e.g., cyclic prefix) that enables the base station to concurrently decode the received MIMO transmissions.

In aspects, the base station 120 configures the APDs 180 and/or UEs 110 for MIMO transmissions by sending surface configurations to the APDs through APD control channels (APD control channel 511 or 512) and sending UE TA values to the UEs through low-band connections (e.g., low-band connection 512 or low-band connection 522). The base station 120 can send the surface configurations as full configuration messages (or commands) or send the surface configurations as partial configuration messages (or commands). In some cases, a partial surface command may correspond to a subset of configuration parameters for uplink APD MIMO settings or another subset of configuration parameters for downlink APD MIMO settings. Alternatively or additionally, the surface configurations sent by the base station may indicate absolute values for a phase vector or TA setting, or delta values to be applied by the APD to a current (e.g., previously configured) phase vector or TA setting.

As shown in FIG. 6, the base station sends the surface configuration 611 to the APD 181 using the APD control channel 511 and sending the UE TA value 631 (e.g., for uplink MIMO) to the UE 111 using the low-band connection 521 to enable a first communication path for MIMO transmissions. The base station also sends the surface configuration 612 to the APD 182 using the APD control channel 512 and sends the UE TA value 632 to the UE 112 using the low-band connection 521 to enable a second communication path for the MIMO transmissions. Based on the surface configurations 611 and 612, the base station 120 can direct the corresponding APDs 180 of the communication paths to implement multiple concurrent phase vectors at a same time or time slot in accordance with the various MIMO configurations described herein.

With reference to downlink MU-MIMO communications, the base station 120 uses the MIMO transmission configurations to coordinate the application of the concurrent phase vectors such that respective phase vectors applied by the APDs may be time-aligned with a PDSCH of downlink transmissions of the base station. In some implementations, the base station associates each APD phase vector with a downlink MU-MIMO antenna port or beam to a specific UE. In the context of FIG. 6, the base station may associate a first MU-MIMO downlink beam that includes signal ray 641 with phase vector 7 of the APD 181, which is applied in alignment (e.g., using APD TA value) with a PDSCH of the MU-MIMO transmissions. The base station 120 may also associate a second MU-MIMO downlink beam that includes signal ray 642 with phase vector 24 of the APD 182, which is applied in alignment with the PDSCH of the MU-MIMO transmissions. Based on the incident downlink signal rays 641 and 642, the APD 181 directs reflected signal ray 651 of a first reflected beam toward the UE 111 and the APD 182 directs reflected signal ray 652 of a second reflected beam toward the UE 112. Accordingly, the base station 120 may use the APDs 181 and 182 to implement downlink MU-MIMO transmissions to the UEs 111 and 112 utilizing same time and frequency resources, which may improve spectral efficiency of the wireless network.

When implementing uplink MU-MIMO communications, the base station 120 uses the MIMO transmission configurations to coordinate the application of the concurrent phase vectors such that respective phase vectors applied by the APDs are time-aligned with respective PDSCHs of the UEs. In some implementations, the base station associates each APD phase vector with a respective uplink antenna port of a corresponding UE. In the context of FIG. 6, the base station may associate a first antenna port of an uplink beam that includes signal ray 661 with the phase vector 7 of the APD 181, which is applied in alignment (e.g., using APD TA value) with a PUSCH of the UE-originating MU-MIMO transmissions. The base station 120 may also associate a second antenna port of an uplink beam that includes signal ray 662 with the phase vector 24 of the APD 182, which is applied in alignment with the PUSCH of the UE-originating MU-MIMO transmissions.

As described herein, the base station 120 may send respective timing advance information to the APDs to time-align application of the APD phase vector associated with the UE with the corresponding PUSCH transmission from that UE. Thus, the base station can provide a TA value (when needed) for each associated uplink phase vector associated with one of the corresponding UEs of the scheduled MU-MIMO transmission. Note that the base station 120 may send the APD TA value as a separate command to the APD (e.g., from a surface configuration) to control the timing of the implementation or application of the phase vector by the APD. In some cases, the APD timing advance command is separate from, though related to, the timing advance command (e.g., TA value 631 or 632) that the base station sends to the corresponding UE to adjust uplink transmission timing of the UE. Thus, the base station may calculate an APD TA value based on a timing advance command sent to the corresponding UE and/or the PUSCH timing of the corresponding UE.

Based on the incident uplink signal rays 661 and 662, the APD 181 reflects signal ray 671 of a first reflected beam toward the base station 120 and the APD 182 reflects signal ray 672 of a second reflected beam toward the base station. In aspects, the base station may schedule the respective UE uplink transmissions, configure the UE TA values, and/or configure the APD TA values to provide reflected uplink MU-MIMO transmissions that reach the base station within an amount of time (e.g., cyclic prefix) to enable decoding of the received MU-MIMO transmissions. Accordingly, the base station 120 may use the APDs 181 and 182 to implement uplink MU-MIMO transmissions from the UEs 111 and 112 that utilize same time and frequency resources, which may improve spectral efficiency of the wireless network.

FIG. 7 illustrates at 700 an example of using multiple APDs for SU-MIMO transmissions with a UE in accordance with one or more aspects. An environment of the example 700 includes the base station 120, the APD 181, the APD 182, and the UE 111 of FIG. 1, which may communicate as described with reference to FIGS. 1-6. As shown in FIG. 7, and in a similar manner to that described with reference to the wireless link 130 of FIG. 1, the base station 120 may communicate with the UE 111 using a low-band connection 521 (e.g., below 6 GHz, sub-6 GHz). In this example, the base station 120 also communicates with the UE 111 using a first high-band connection 721 that includes an RIS 322 of the APD 181 and a second high-band connection 722 that includes an RIS 322 of the APD 182.

Generally, the aspects of SU-MIMO transmissions as described with reference to FIG. 7 may be implemented similarly to those described with reference to FIG. 6 with a single UE (UE 111). Here, assume that CSI-RS indices provided by UE 111 indicate that phase vector 8 of the APD 181 and phase vector 27 provide the two highest RSRP values, and that CSI-RS indices were not received from other UEs. Accordingly, the base station 120 groups UE 111 with APD 181 and APD 182 for scheduling SU-MIMO transmissions through the respective communication paths illustrated in FIG. 7. In this example, the base station determines a surface configuration 711 for APD 181 and a surface configuration 712 for APD 182. Based on the previously mentioned channel characterization process results, the surface configuration 711 may include an indication of the phase vector 8 for APD 181 and one or more APD TA values based on the propagation delays between the base station and APD 181 or the UE 111 and the APD 181. The surface configuration 712 can include an indication of the phase vector 27 for APD 182 and one or more other APD TA values based on the propagation delay between the base station and APD 182 or the UE 111 and the APD 182. In aspects, a surface configuration may be implemented as a combined configuration with parameters for uplink and downlink MIMO transmissions as described here or be implemented as separate configurations. To configure the APDs for SU-MIMO, as shown in FIG. 7 the base station 120 sends the surface configuration 711 to the APD 181 using the APD control channel 511 and sends the surface configuration 712 to the APD 182 using the APD control channel 512.

For uplink SU-MIMO transmissions, the base station can determine UE TA values 731 for UE 111 based on the propagation delay between the UE 111 and the base station using APD 181 and/or the propagation delay between the UE 111 and the base station using APD 182. The base station may configure the UE TA values 731 such that uplink MIMO transmissions through each APD-enabled communication path reach the base station within a time window (e.g., cyclic prefix) that enables the base station to concurrently decode the received SU-MIMO transmissions. As shown in FIG. 7, the base station sends the UE TA values 731 (e.g., for uplink MIMO) to the UE 111 using the low-band connection 521 to enable first and second communication paths for uplink SU-MIMO transmissions. Based on the surface configurations 711 and 712, the base station 120 can direct the corresponding APDs 180 of the communication paths to implement multiple concurrent phase vectors at a same time or time slot in accordance with the various MIMO configurations described herein.

To implement downlink SU-MIMO communications, the base station 120 uses the MIMO transmission configurations to coordinate the application of the concurrent phase vectors such that respective phase vectors applied by the APDs may be time-aligned with a PDSCH of downlink transmissions of the base station. In some cases, the base station associates each APD phase vector with a downlink SU-MIMO antenna port or beam to the UE through a specific communication path. In the context of FIG. 7, the base station may associate a first SU-MIMO downlink beam that includes signal ray 741 with phase vector 8 of the APD 181, which is applied in alignment (e.g., using APD TA value) with a PDSCH of the SU-MIMO transmissions. The base station 120 may also associate a second SU-MIMO downlink beam that includes signal ray 742 with phase vector 27 of the APD 182, which is applied in alignment with the PDSCH of the SU-MIMO transmissions. Based on the incident downlink signal rays 741 and 742, the APD 181 directs reflected signal ray 751 of a first reflected beam toward the UE 111 and the APD 182 directs reflected signal ray 752 of a second reflected beam toward the UE 111. Accordingly, the base station 120 may use the APDs 181 and 182 to implement downlink SU-MIMO transmissions to the UE 111 utilizing same time and frequency resources, which may improve spectral efficiency of the wireless network.

When implementing uplink SU-MIMO communications, the base station 120 uses the MIMO transmission configurations to coordinate the application of the concurrent phase vectors such that respective phase vectors applied by the APDs are time-aligned with the PDSCH of the UE. In some cases, the base station associates each APD phase vector with a respective uplink antenna port of the UE. In the context of FIG. 7, the base station may associate a first antenna port of an uplink beam that includes signal ray 761 with the phase vector 8 of the APD 181, which is applied in alignment (e.g., using APD TA value) with the PUSCH of the UE 111. The base station 120 may also associate a second antenna port of an uplink beam that includes signal ray 762 with the phase vector 27 of the APD 182, which is applied in alignment with the PUSCH of the UE 111. Based on the incident uplink signal rays 761 and 762, the APD 181 reflects signal ray 771 of a first reflected beam toward the base station 120 and the APD 182 reflects signal ray 772 of a second reflected beam toward the base station. In aspects, the base station may schedule the UE uplink transmissions, configure the UE TA values, and/or configure the APD TA values to provide reflected uplink SU-MIMO transmissions that reach the base station within an amount of time (e.g., cyclic prefix) to enable decoding of the received SU-MIMO transmissions. Accordingly, the base station 120 may use the APDs 181 and 182 to implement uplink SU-MIMO transmissions from the UE 111 that utilize same time and frequency resources, which may improve spectral efficiency of the wireless network.

Figure 8:
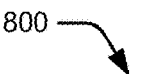
FIG. 8 illustrates an example of using multiple APD surface partitions for MIMO transmissions with multiple user equipment in accordance with one or more aspects.

FIG. 8 illustrates at 800 an example of using multiple APD surface partitions for MU-MIMO transmissions with multiple UEs in accordance with one or more aspects. An environment of the example 800 includes the base station 120, the APD 181, the UE 111, and the UE 112 of FIG. 1, which may communicate as described with reference to FIGS. 1-7. As shown in FIG. 8, and in a similar manner to that described with reference to the wireless link 130 of FIG. 1, the base station 120 may communicate with the UE 111 using a low-band connection 521 (e.g., below 6 GHz, sub-6 GHz) and communicate with the UE 112 using a low-band connection 522. In this example, the base station 120 also communicates with the UE 111 using a high-band connection 821 that includes a first partition 881 (e.g., a first RIS) of the APD 181 and communicates with UE 112 using a high-band connection 822 that includes a second partition 882 (e.g., a second RIS) of the APD 181.

Generally, the aspects of SU-MIMO transmissions as described with reference to FIG. 8 may be implemented similarly to those described with reference to FIG. 6 with a single APD (APD 181). Here, assume that CSI-RS indices provided by UE 111 indicate that phase vector 5 of APD 181 provided a highest RSRP value and that CSI-RS indices of UE 112 indicate that phase vector 9 of APD 181 provided a highest RSRP value for the channel characterization process. In the context of this example of MU-MIMO, the respective CSI-RS indices of the UE 111 and UE 112 may not include measurements of other APDs or may indicate that reflections of CRSs or SRSs provided by other APDs are unlikely to support MIMO communications (e.g., low RSRP or excessive signal fading). Accordingly, the base station 120 pairs UE 111 with the first partition 881 of the APD 181 and pairs the UE 112 with the second partition 882 of the APD 181 for scheduling MU-MIMO transmissions through the respective communication paths illustrated in FIG. 8.

In aspects, the base station 120 or MIMO function 268 determines a MIMO transmission configuration for the APD partitions and/or the UEs by analyzing signal metrics of a channel characterization process as described herein. The MIMO transmission configuration may include, for each APD partition, a respective phase vector, APD partition TA value, UE TA value, and so forth. Thus, the base station 120 may determine and/or select surface configurations based on apportioning access to the APD 180, such as panel-partitioned access or APD sub-panel access. As one example, the base station 120 selects surface configurations 811 based on panel-partitioning (e.g., apportioning configurable surface elements) such that the base station transmits the respective MIMO transmissions to each receiving UE contemporaneously and/or simultaneously using the APD partitions 881 and 882 as shown in the example 800.

To illustrate, the base station 120 apportions the configurable surface elements of the APD 181 into subsets of configurable surface elements, such as horizontal partitioning that groups a first subset of configurable surface elements (of the RIS) that are in a same horizontal row (e.g., APD partitions 881 and 882), vertical partitioning that groups a second subset of configurable surface elements that in a same vertical column, quadrant partitioning that groups subsets of configurable surface elements that are in a same quadrant of the RIS, and/or any other combination of suitable partition geometries. Based on the apportioned access, the base station 120 selects the first surface configuration for modifying a first subset of configurable surface elements of the APD 181 and selects the second surface configuration for modifying a second subset of configurable surface elements of the APD 181, and so forth. When each surface configuration uses different configurable surface elements of the APD 181 and/or different APD timing advance values, the base station 120 can transmit the separate spatial streams of MIMO transmissions towards the APD surface contemporaneously and/or simultaneously by directing MIMO transmission spatial stream towards the respective subset of configurable surface elements. In aspects, a same APD may also be used for multiple streams of MIMO transmissions by using different respective polarizations of the transmissions and/or APD phase vectors. For example, a transmitter (e.g., base station or UE(s)) may apply different polarizations (e.g., vertical, horizontal, linear, circular, and so forth) to separate streams of MIMO transmission and the APD may apply phase vectors with corresponding polarizations to provide reflections of the MIMO transmissions to the receiver(s).

For descriptive brevity, the base station 120 of FIG. 8 may determine a MIMO transmission configuration for APD-enabled communication paths formed by the APD partition 881, the APD partition 882, the APD 182, and the UE 111 similarly as described with reference to FIGS. 5A-7, FIG. 9, the transactions of FIGS. 10 and 11, and/or the method of FIG. 12. In this example, the base station determines a surface configuration 811 for APD partition 881 and a respective surface configuration APD partition 882 of the APD 181. Based on the previously mentioned channel characterization process results, the surface configuration 811 may include an indication of the phase vector 5 for APD partition 881, an indication of the phase vector 9 for APD partition 882, and one or more APD TA values based on the propagation delays between the base station and APD 181, between the APD 181 and the UE 111, or between the APD 181 and the UE 112. In aspects, a surface configuration may be implemented as a combined configuration with parameters for uplink and downlink MIMO transmissions as described here or be implemented as separate configurations. To configure the APD for MU-MIMO, as shown in FIG. 8, the base station 120 sends the surface configuration 811 to the APD 181 using the APD control channel 511.

For uplink MU-MIMO transmissions, the base station can determine UE TA value 831 for UE 111 based on the propagation delay between the UE 111 and the base station and a UE TA value 832 for UE 112 based on the propagation delay between the UE 112 and the base station. The base station may configure the UE TA values 831 and 832 such that uplink MIMO transmissions reach the base station within a time window (e.g., cyclic prefix) that enables the base station to concurrently decode the received MIMO transmissions. As shown in FIG. 8, the base station sends the UE TA value 831 to the UE 111 using the low-band connection 521 and sends the UE TA value 832 to UE 112 using the low-band connection 522 to enable the first and second communication paths that include the APD partition 881 and APD partition 882 for uplink MU-MIMO transmissions. Based on the surface configurations 711, the base station 120 can direct the corresponding APD partitions 881 and 882 of the communication paths to implement multiple concurrent phase vectors at a same time or time slot in accordance with the various MIMO configurations described herein.

To implement downlink MU-MIMO communications, the base station 120 uses the MIMO transmission configurations to coordinate the application of the concurrent phase vectors such that respective phase vectors applied by the APD partitions may be time-aligned with a PDSCH of downlink transmissions of the base station. In some cases, the base station associates each APD partition phase vector with a downlink MU-MIMO antenna port or beam to a specific UE. In the context of FIG. 8, the base station may associate a first MU-MIMO downlink beam that includes signal ray 841 with phase vector 5 of APD partition 881, which is applied in alignment (e.g., using APD TA value) with a PDSCH of the MU-MIMO transmissions. The base station 120 may also associate a second MU-MIMO downlink beam that includes signal ray 842 with phase vector 9 of APD partition 882, which is applied in alignment with the PDSCH of the MU-MIMO transmissions. Based on the incident downlink signal rays 841 and 842, the APD partition 881 directs reflected signal ray 851 of a first reflected beam toward the UE 111 and the APD partition 882 directs reflected signal ray 852 of a second reflected beam toward the UE 112. Accordingly, the base station 120 may use the APD partitions 881 and 882 to implement downlink MU-MIMO transmissions to the UEs 111 and 112 utilizing same time and frequency resources, which may improve spectral efficiency of the wireless network.

When implementing uplink MU-MIMO communications, the base station 120 uses the MIMO transmission configurations to coordinate the application of the concurrent phase vectors such that respective phase vectors applied by the APD partitions are time-aligned with respective PUSCHs of the UEs. In some cases, the base station associates each APD partition phase vector with a respective uplink antenna port of a corresponding UE. In the context of FIG. 8, the base station may associate a first antenna port of an uplink beam that includes signal ray 861 with the phase vector 5 of APD partition 881, which is applied in alignment (e.g., using APD TA value) with a PUSCH of the UE 111. The base station 120 may also associate a second antenna port of an uplink beam that includes signal ray 862 with the phase vector 9 of APD partition 882, which is applied in alignment with the PUSCH of the UE 112.

As described herein, the base station 120 may send respective timing advance information to the APDs to time-align application of the APD phase vector associated with the UE with the corresponding PUSCH transmission from that UE. Thus, the base station can provide a TA value (when needed) for each associated uplink phase vector associated with one of the corresponding UEs of the scheduled MU-MIMO transmission. Based on the incident uplink signal rays 861 and 862, the APD partition 881 reflects signal ray 871 of a first reflected beam toward the base station 120 and the APD partition 882 reflects signal ray 872 of a second reflected beam toward the base station. In aspects, the base station may schedule the respective UE uplink transmissions, configure the UE TA values, and/or configure the APD partition TA values to provide reflected uplink MU-MIMO transmissions that reach the base station within an amount of time (e.g., cyclic prefix) to enable decoding of the received MU-MIMO transmissions. Accordingly, the base station 120 may use the APD partition 881 and 882 to implement uplink MU-MIMO transmissions from the UEs 111 and 112 that utilize same time and frequency resources, which may improve spectral efficiency of the wireless network.

Figure 9:
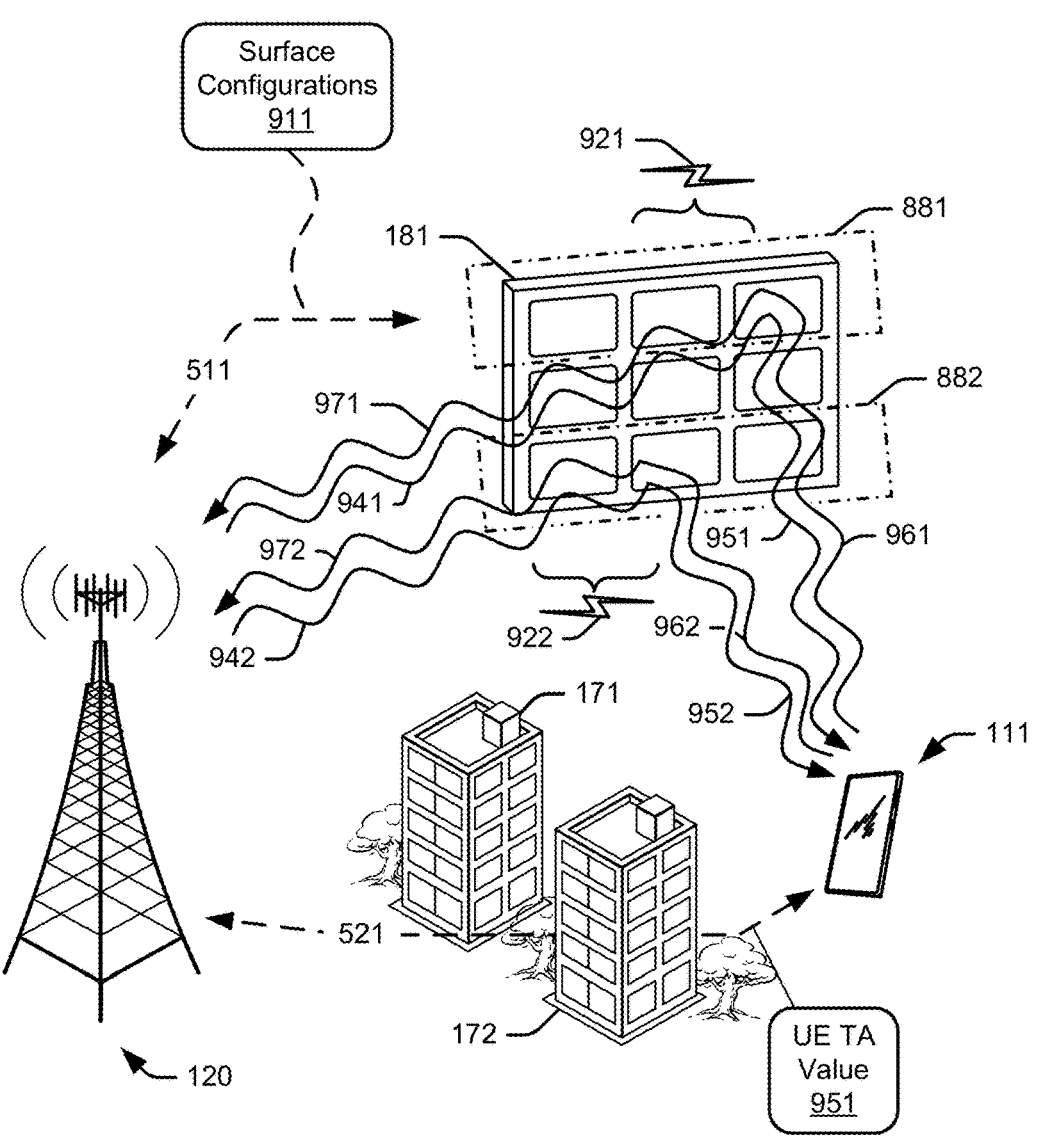
FIG. 9 illustrates an example of using multiple APD surface partitions for MIMO transmissions with a user equipment in accordance with one or more aspects.

FIG. 9 illustrates at 900 an example of using multiple APD partitions for SU-MIMO transmissions with a UE in accordance with one or more aspects. An environment of the example 900 includes the base station 120, the APD 181, and the UE 111 of FIG. 1, which may communicate as described with reference to FIGS. 1-8. As shown in FIG. 9, and in a similar manner to that described with reference to the wireless link 130 of FIG. 1, the base station 120 may communicate with the UE 111 using a low-band connection 521 (e.g., below 6 GHz, sub-6 GHz). In this example, the base station 120 also communicates with the UE 111 using a first high-band connection 921 that includes a first partition 881 (e.g., a first RIS) of the APD 181 and a second high-band connection 922 that includes a second partition 882 (e.g., a second RIS) of the APD 181. To configure and direct the application of downlink or uplink phase vectors, the base station communicates with the APD 181 using the APD control channel 511, which may represent a wide-beam low-band APD control channel or a narrow-beam APD control channel.

To enable the SU-MIMO transmissions shown in FIG. 9, the base station 120 may select a group of candidate APDs 180 that includes APD 181 and implement a channel characterization process as described with reference to FIGS. 5A, 5B, 10, 11, and/or 12 to obtain uplink or downlink signal reports (e.g., signaling metrics). Based on the uplink and/or downlink signal reports, the base station 120 selects one UE with which to implement MIMO transmissions. Here, assume that SRSs received by the base station indicate that phase vector 6 of APD partition 881 provided a highest RSRP value for UE 111 and phase vector 7 of APD partition 882 provided a next-highest RSRP value for UE 111. Further, assume the base station did not receive SRS reflections from other combinations of APDs and UEs that indicated viable APD-enabled communication paths. Accordingly, the base station 120 groups the UE 111 with the first partition 881 and the second partition 882 of the APD 181 for scheduling SU-MIMO transmissions through the respective communication paths illustrated in FIG. 9.

In aspects, the base station determines a MIMO transmission configuration for the APD partitions and selected UE by analyzing signal metrics of a channel characterization process as described herein. The MIMO transmission configuration may include APD partition phase vectors, APD partition TA values, a UE TA value, and so forth. For descriptive brevity, the base station 120 of FIG. 9 may determine a MIMO transmission configuration for APD-enabled communication paths formed by the APD partition 881, APD partition 882, and the UE 111 similarly as described with reference to FIGS. 5A-8, the transactions of FIGS. 10 and 11, and/or the method of FIG. 12. In this example, the base station determines a surface configuration 911 for APD partition 881 and APD partition 882 of the APD 181. Based on the previously mentioned channel characterization process results, the surface configuration 911 may include an indication of the phase vector 6 for both APD partition 881 and APD partition 881 and one or more APD TA values based on the propagation delays between the base station and APD 181 or between the APD 181 and the UE 111. In other cases, such as large APDs, the surface configuration may include different phase vectors for the multiple partitions of the APD. In aspects, a surface configuration may be implemented as a combined configuration with parameters for uplink and downlink MIMO transmissions as described here or be implemented as separate configurations. To configure the APD for MU-MIMO, as shown in FIG. 9, the base station 120 sends the surface configuration 911 to the APD 181 using the APD control channel 511.

For uplink SU-MIMO transmissions, the base station can determine a UE TA value 931 for UE 111 based on the propagation delay between the UE 111 and the base station when using APD 181 and/or a PUSCH of the UE 111. In some cases, the base station may determine multiple UE TA values such that the uplink MIMO transmissions through each APD-partition-enabled communication path reach the base station within a time window (e.g., cyclic prefix) that enables the base station to concurrently decode the received SU-MIMO transmissions. As shown in FIG. 9, the base station sends the UE TA value 951 to the UE 111 using the low-band connection 521 to enable first and second communication paths for uplink SU-MIMO transmissions. Based on the surface configuration 911, the base station 120 can direct the corresponding partitions of APD 181 of the communication paths to implement multiple concurrent phase vectors at a same time or time slot in accordance with the various MIMO configurations described herein.

To implement downlink SU-MIMO communications, the base station 120 uses the MIMO transmission configurations to coordinate the application of the concurrent phase vectors such that respective phase vectors applied by the APD partitions may be time-aligned with a PDSCH of downlink transmissions of the base station. As described herein, the base station may associate each APD partition phase vector with a downlink SU-MIMO antenna port or beam to the UE through a specific communication path. In the context of FIG. 9, the base station associates a first SU-MIMO downlink beam that includes signal ray 941 with phase vector 6 of the APD partition 881, which is applied in alignment (e.g., using APD TA value) with a PDSCH of the SU-MIMO transmissions. The base station 120 also associates a second SU-MIMO downlink beam that includes signal ray 942 with phase vector 6 of the APD partition 882, which is applied in alignment with the PDSCH of the SU-MIMO transmissions. Based on the incident downlink signal rays 941 and 942, the APD partition 881 directs reflected signal ray 951 of a first reflected beam toward the UE 111 and the APD partition 882 directs reflected signal ray 952 of a second reflected beam toward the UE 111. Accordingly, the base station 120 may use the APD partitions 881 and 882 to implement downlink SU-MIMO transmissions to the UE 111 utilizing same time and frequency resources, which may improve spectral efficiency of the wireless network.

When implementing uplink SU-MIMO communications, the base station 120 uses the MIMO transmission configurations to coordinate the application of the concurrent phase vectors such that respective phase vectors applied by the APD partitions are time-aligned with respective PUSCH of the UE. In some cases, the base station associates each APD partition phase vector with a respective uplink antenna port of the UE. In the context of FIG. 9, the base station associates a first antenna port of an uplink beam that includes signal ray 961 with the phase vector 6 of APD partition 881, which is applied in alignment (e.g., using APD TA value) with a PUSCH of the UE 111. The base station 120 also associates a second antenna port of an uplink beam that includes signal ray 962 with the phase vector 6 of APD partition 882, which is applied in alignment with the PUSCH of the UE 111. Based on the incident uplink signal rays 961 and 962, the APD partition 881 reflects signal ray 971 of a first reflected beam toward the base station 120 and the APD partition 882 reflects signal ray 972 of a second reflected beam toward the base station. In aspects, the base station may schedule the UE uplink transmissions, configure the UE TA value(s), and/or configure the APD TA values to provide reflected uplink SU-MIMO transmissions that reach the base station within an amount of time (e.g., cyclic prefix) to enable decoding of the received SU-MIMO transmissions. Accordingly, the base station 120 may use the APD partitions 881 and 882 to implement uplink SU-MIMO transmissions by the UE 111 that utilize same time and frequency resources, which may improve spectral efficiency of the wireless network.

Transactions of MIMO Transmissions Using APDs

Various aspects of MIMO transmissions using APDs enable a base station to use one or more APDs in at least one communication path for MIMO transmissions with respective UEs. Generally, the base station can select and configure the one or more APDs by which to implement MU-MIMO communication with multiple UEs or SU-MIMO communication with a UE based on channel information or results of a channel characterization process. By so doing, the base station may implement MIMO transmissions using APDs to communicate with the UEs using same time and frequency resources, which can improve spectral efficiency of a wireless network.

Figure 10:
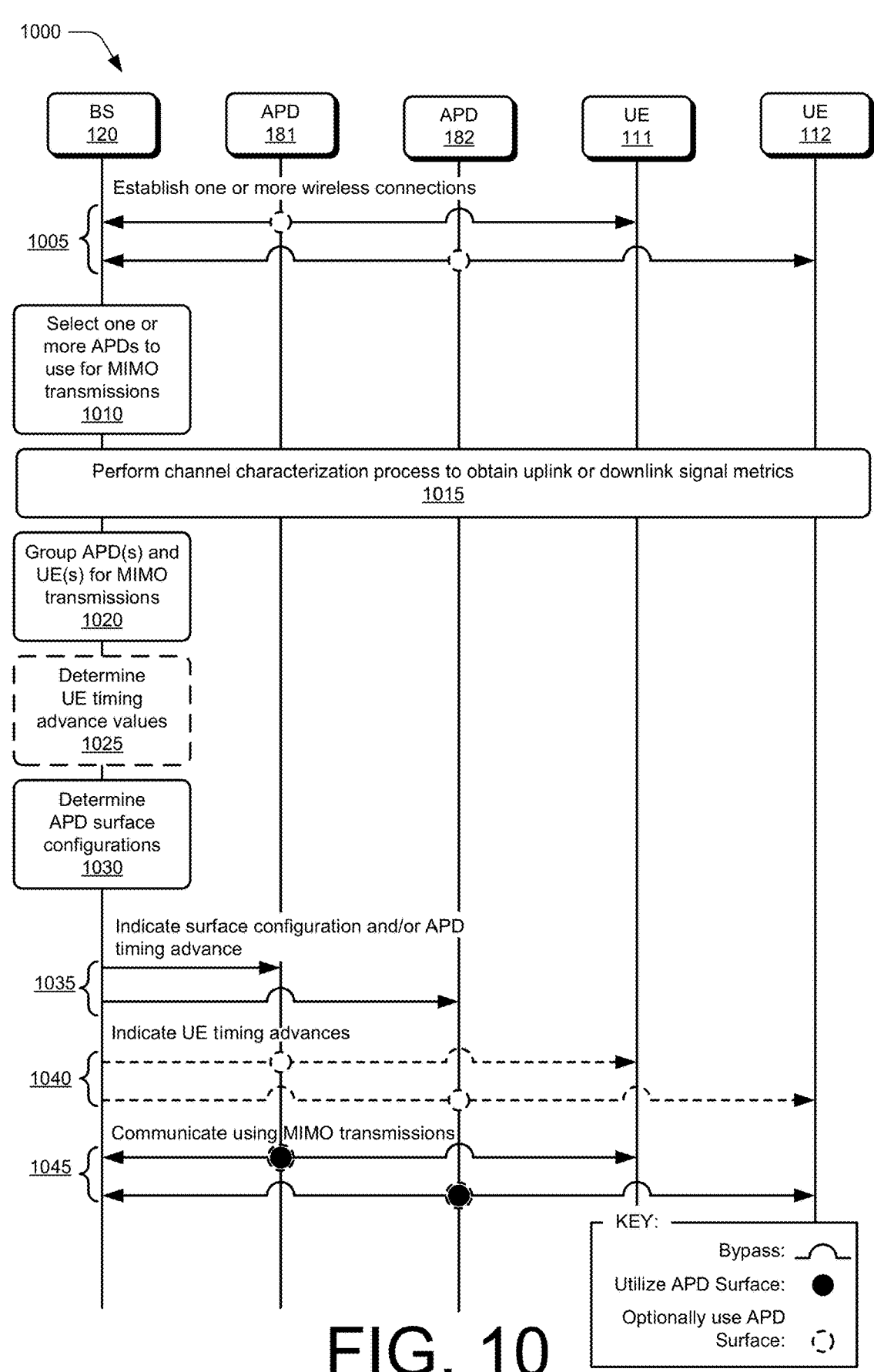
FIG. 10 illustrates example details of signaling and control transactions that can be used to implement various aspects of MIMO transmissions using APDs.
Figure 11:
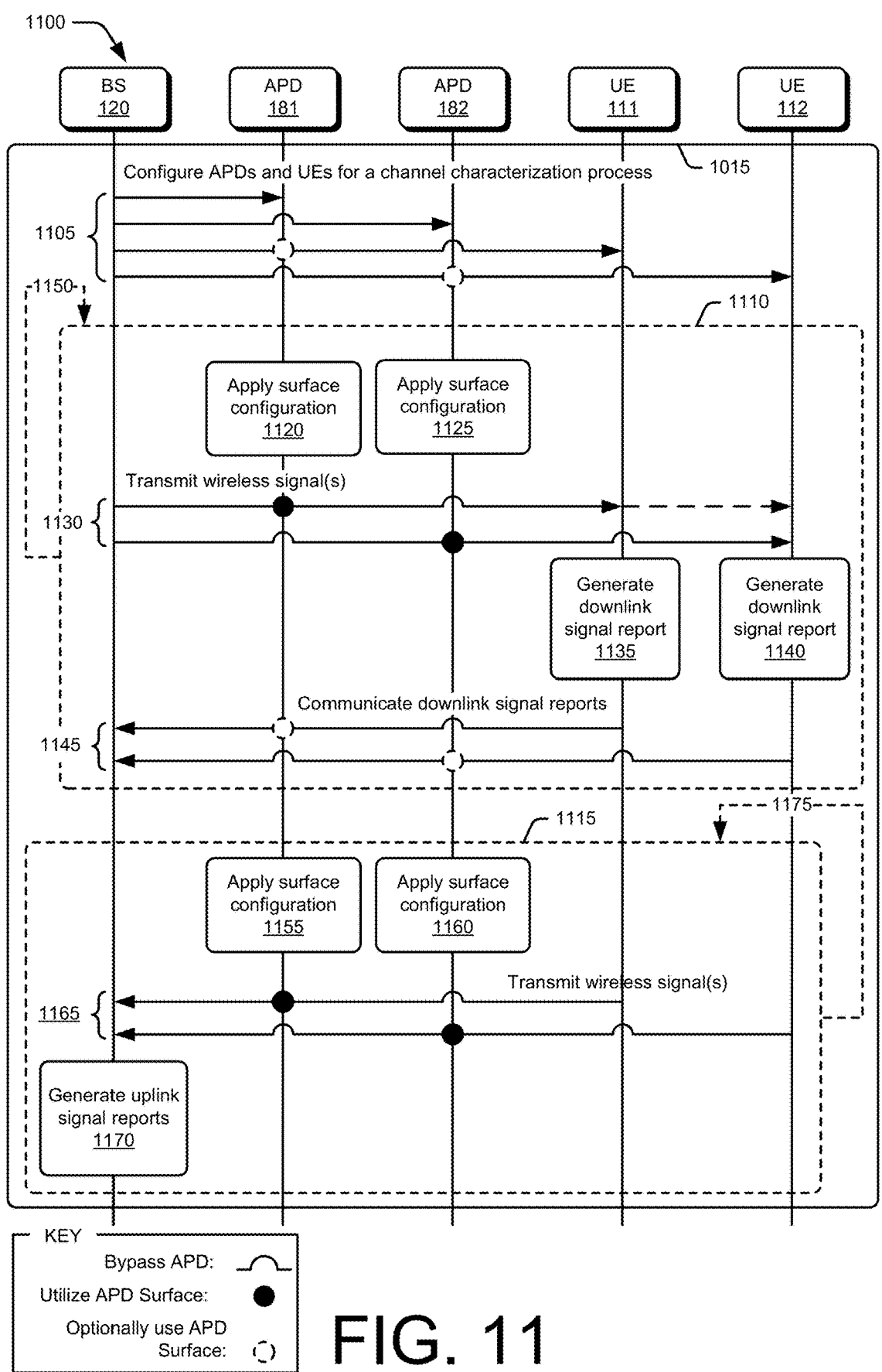
FIG. 11 illustrates example details of signaling and control transactions that can be used to implement channel characterization in accordance with one or more aspects.

FIGS. 10 and 11 provide some examples of signaling and control transactions performed between entities, such as a base station (e.g., base station 120), APDs (e.g., APDs 181 and 182 and/or APD partitions 881 and 882), and UEs (e.g., UEs 111 and 112), to implement various aspects of MIMO transmissions using APDs. The described examples include a base station configuring various combinations of APDs and UEs to communicate using MIMO transmissions (e.g., FIG. 10) and using APDs to perform downlink or uplink channel characterization processes (e.g., FIG. 11). Various operations described with reference to FIGS. 10 and 11 can be performed by any entity described with reference to FIGS. 1-4, combined with operations of other examples of FIGS. 5A-9 and/or combined with operations of the methods illustrated in FIG. 12.

FIG. 10 illustrates an example of signaling and control transactions for MIMO transmissions using APDs in accordance with one or more aspects. A signaling and control transaction diagram 1100 includes signaling and control transactions among a base station 120, an APD 181, an APD 182, a UE 111, and a UE 112, which may be implemented as described with reference to FIGS. 1-9. Generally, the illustrated transactions may enable the base station 120 or MIMO function 268 to configure and use the APD 181 and/or the APD 182 for SU-MIMO communications with a UE (e.g., UE 111 or UE 112) or MU-MIMO communications with multiple UEs (e.g., UE 111 and UE 112).

At 1005, the base station 120 establishes respective wireless connections with at least one of the UE 111 and the UE 112. The respective wireless connections established with the UEs may include a low-band connection that enables non-LoS communication between the base station and either of the UEs. In some cases, the base station may also establish a high-band connection with a UE, either directly or through a communication path that includes a surface of the APD 181 or the APD 182. For instance, the base station may establish a low-band connection and a high-band connection with a UE to enable communication between the UE and the base station in frequency bands below 6 GHz and above 6 GHz.

In aspects, the base station may also determine at 1005 to use one or more APDs for MIMO transmissions with at least one of the UEs. The base station may do so to schedule downlink MIMO transmissions to one or more of the UEs or to schedule uplink MIMO transmissions from one or more of the UEs. Alternatively or additionally, the base station may determine to include an APD-enabled communication path to enable a MIMO communication with at least one of the UEs. By way of example, the base station may unsuccessfully attempt to establish the high-band wireless connection with a UE. For instance, the base station 120 attempts to establish the high-band wireless link with the UE 111, but obstructions (e.g., the obstructions 171 or 172) block an LoS communication path, thus causing signal failure. In other cases, the base station may analyze the signal- and/or link-quality measurements and detect a channel impairment or detect that the signal- and/or link-quality measurements are trending to fall below an acceptable performance level. As another example, the base station 120 can analyze historical records using the UE-location information and identify that the UE location is historically associated with APD wireless communications or that the UE 110 is moving towards a location historically associated with APD communications.

At 1010, the base station selects one or more APDs to use for MIMO transmissions with the UE 111 and/or the UE 112. For example, the base station may select a set or group of candidate APDs for evaluation to use for MIMO transmissions based on proximity of an APD to a position of one of the UEs (e.g., within a threshold distance) or historical records of using the APD to communicate with UEs proximate the position of the UE. Alternatively or additionally, the base station can monitor respective APD-broadcast signals from the APDs, access APD records that indicate APDs within a cell service area, queries a server that stores APD information, use UE-location information to identify APDs within operating range of the UE 110, and so forth.

At 1015, the base station performs a channel characterization process with the one or more APDs to obtain uplink signal metrics or downlink signal metrics. The channel characterization process may include binding resources or parameters of a channel characterization process with an APD beam sweeping pattern to enable a receiving device to identify reflections of reference signals received from the APD. In aspects, the base station configures the one or more APDs to implement beam sweeping patterns while the base station transmits downlink reference signals or while the UEs transmit uplink reference signals to enable characterization of the channels between the base station and the UEs. In some cases, the base station implements a CSI process (e.g., FIG. 5A) with at least one APD and one or more of the UEs to obtain downlink signal reports for reflections of CSI-RSs that reach the one or more UEs from the at least one APD. Alternatively or additionally, the base station can implement an SRS process (e.g., FIG. 5B) with at least one APD and one or more of the UEs to obtain uplink signal measurements of reflections of SRSs that reach the base station from the at least one APD.

At 1020, the base station 120 groups APD(s) 180 and UE(s) 110 for MIMO transmissions. Based on results of the channel characterization process, the base station can group various combinations of UEs and APDs to implement uplink and/or downlink MIMO transmissions. In aspects, the base station selects, based on the channel characterization process, multiple UEs to communicate with using MU-MIMO or selects one UE to communicate with using SU-MIMO. For example, the base station may group multiple UEs with respective APDs to implement MU-MIMO transmissions as described with reference to FIG. 6. In other cases, the base station may group one UE with multiple APDs to implement SU-MIMO transmissions as described with reference to FIG. 7. As another example, the base station may group multiple APDs with respective partitions of a single APD to implement MU-MIMO transmissions as described with reference to FIG. 8. Alternatively, the base station can group a single UE with multiple partitions of an APD to implement SU-MIMO using one APD as described with reference to FIG. 9.

Optionally at 1025, the base station determines UE timing advance values for uplink MIMO transmissions. For example, the base station 120 may determine uplink timing advance information that includes respective timing advance commands or values, which may account for different propagation distances through respective APD-enabled communication paths of the UEs. In some cases, the UE timing advance command is separate from, though related to, the APD timing advance command that the base station sends to the corresponding APD. As described herein, the APD timing advance can adjust timing of the application of a phase vector by the APD to coincide with an uplink transmission timing of the UE that is modified based on the UE timing advance.

At 1030, the base station determines surface configurations for the one or more APDs. Generally, the base station uses the results of the channel characterization process to determine respective phase vectors for the one or more APDs or APD partitions to enable MIMO communications through APD-enabled communication paths. Alternatively or additionally, the base station may determine APD timing advance values to time-align the application of a phase vector by the APD with an uplink or downlink transmission. Accordingly, a surface configuration for an APD (or APD partition) may include a phase vector, an indication of physical channel timing (e.g., PUSCH or PDSCH) or time slot during which to apply the phase vector, and an APD timing advance value to adjust application of the phase vector relative timing specified with the physical channel. In some cases, the APD timing adjustment value is based on a timing advance value of a corresponding UE for uplink communications. Respective APD timing adjustment values may also be determined based on propagation delays calculated for communications between the base station and APD and/or the UE and the APD.

At 1035, the base station sends indications of respective surface configurations to at least one of the APDs selected for MIMO transmissions. In some cases, the base station sends respective surface configurations to multiple APDs that enable respective APD-enabled communication paths for MU-MIMO with multiple UEs (e.g., FIG. 6) or enable respective APD-enabled communication paths for SU-MIMO with one UE (e.g., FIG. 7). In other cases, the station sends surface configurations to one APD that enable respective communication paths using APD partitions for MU-MIMO with multiple UEs (e.g., FIG. 8) or enable respective communication paths using APD partitions for SU-MIMO with one UE (e.g., FIG. 9).

Optionally at 1040, the base station sends indications of respective UE timing advance values to at least one of the UEs selected for the MIMO transmissions. For example, the base station may send indications of respective UE timing advance values to multiple UEs to adjust corresponding uplink transmission times such that uplink MU-MIMO transmissions from the multiple UEs reach the base station within an amount of time (e.g., a cyclic prefix) that enables decoding of the received transmissions. Alternatively, the base station may send UE timing advances to one UE that communicates with the base station through multiple APD-enabled communication paths such that uplink SU-MIMO transmissions reach the base station within an amount of time that enables decoding of the received transmissions.

At 1045, the base station communicates with the UEs using MIMO transmissions. In aspects, the base station may communicate with the UEs or one UE (e.g., SU-MIMO) using the surface configurations sent to the one or more APDs. In some cases, the base station implements MU- MIMO (e.g., as indicated at 1045) to transmit downlink transmissions or receive uplink transmissions with multiple UEs using multiple APDs as described with reference to FIG. 6. Alternatively, although not shown by the transactions of 1045, the base station may implement other aspects of MIMO transmissions using APDs as described herein. For example, the base station can implement SU-MIMO to transmit downlink transmissions or receive uplink transmissions with one UE using multiple APDs as described with reference to FIG. 7. In other cases, the base station can implement MU-MIMO to transmit downlink transmissions or receive uplink transmissions with multiple UEs using APD partitions as described with reference to FIG. 8. In yet other cases, the base station can implement SU-MIMO to transmit downlink transmissions or receive uplink transmissions with one UE using APD partitions as described with reference to FIG. 9. From the transactions of 1045, the base station may return to any of the preceding transactions, such as transactions of the sub-diagram 1015 to re-characterize one or more communications paths, to implement another iteration of MIMO transmissions using APDs.

FIG. 11 illustrates at 1100 example details of signaling and control transactions that can be used to implement channel characterization in accordance with one or more aspects. The described transactions may enable a base station 120 or MIMO function 268 to use one or more APDs to sweep reflected downlink or uplink beams through respective communication paths that include one of the APDs. Although illustrated with respective transactions for two APDs 181 and 182 and two UEs 111 and 112, any of the described transactions or sub-diagrams of FIG. 11 may be implemented with any of the combinations or groupings of the APD(s), APD partitions, and UE(s) described herein.

The base station 120, the APD 180s, and/or the UEs 110 may be implemented similar to the entities described with reference to FIGS. 1-9. The example is presented in the context of implementing a channel characterization process, though operations described with reference to FIG. 11 may be initiated or performed by the entities independent of the channel characterization process, such as to implement various transactions and/or operations described with reference to FIGS. 5A-10 or methods of FIG. 12. For example, the base station 120 may select, group, configure, and/or control APDs 180 and UEs 110 as described with reference to FIGS. 5A-10 and/or FIG. 12 to implement various aspects of MIMO transmissions using APDs. In aspects, the transactions of FIG. 11 may correspond to the sub-diagram 1015 of FIG. 10 to perform a channel characterization process to obtain uplink or downlink signal metrics, which may be used to enable aspects of MIMO transmissions using APDs.

At 1105, a base station 120 configures APDs 180 and UEs for a channel characterization process. In aspects, the base station may associate air interface resources of an uplink or downlink channel characterization process with respective phase vectors of a beam sweeping pattern assigned to an APD. The base station may then send, as shown at 1105, indices of the beam sweeping patterns that the APD 181 and APD 182 implement during the channel characterization process to reflect beams of downlink reference signals or uplink reference signals. Alternatively or additionally, the base station may send SRS parameters that are associated with phase vectors of respective APD beam sweeping patterns to the UEs 111 and 112 to enable an uplink channel characterization process as shown at 1105. From 1105, the transactions may proceed to sub-diagram 1110 in which the base station, APDs, and UEs implement transactions of a downlink channel characterization process or proceed to sub-diagram 1115 in which the base station, APDs, and UEs implement transactions of an uplink channel characterization process.

The entities of FIG. 11 may implement the operations of sub-diagram 1110 to perform a downlink channel characterization process for communication paths that include the APDs 181 and 182. As an example, the base station may implement a downlink channel characterization process (CSI procedure) as described with reference to FIG. 5A. Based on the configurations of 1105, the first APD 181 applies a first surface configuration at 1120 to an RIS of the first APD and the second APD 182 applies a second surface configuration at 1125 to an RIS of the second APD. At 1130, the base station transmits downlink wireless signals (e.g., CSI-RSs) that may utilize surfaces of the APDs to provide reflections of the downlink wireless signals that reach one or both of the UEs 111 and 112. At 1135, the first UE 111 generates a downlink signal report (e.g., CSI feedback) of measurements for the reflections of the downlink wireless signals that reach the first UE. Similarly, at 1140, the second UE 112 generates a downlink signal report of measurements for the reflections of downlink wireless signals that reach the second UE. As described with reference to FIG. 5A, a UE may receive reflections of downlink wireless signals from one APD, multiple APDs, or no APDs when various combinations of downlink beams and APD phase vectors fail to result in a reflection that reaches the UE. At 1145, the first UE 111 and second UE 112 communicate the respective downlink signal reports to the base station, which enables the base station to implement other operations for MIMO transmissions with APDs. Optionally at 1150, the base station may implement another iteration of sub-diagram 1110 to perform another channel characterization process. For example, the base station may use at least one of the downlink signal reports provided by the UEs 111 and 112 to refine parameters for downlink beams or APD phase vector selection for a subsequent iteration of channel characterization. When the downlink channel characterization is complete, the base station may then group APDs and UEs as described with reference to FIGS. 5A, 6-10, and 12.

In aspects, the entities of FIG. 11 may implement the operations of sub-diagram 1110 to perform an uplink channel characterization process for communication paths that include the APDs 181 and 182. As an example, the base station may implement an uplink channel characterization process (SRS procedure) as described with reference to FIG. 5B. Based on the configurations of 1105, the first APD 181 applies, at 1155, a first surface configuration to an RIS of the first APD and the second APD 182 applies, at 1160, a second surface configuration to an RIS of the second APD. At 1165, the first UE and the second UE transmit respective uplink wireless signals (e.g., SRSs) that may utilize surfaces of the APDs to provide reflections of the uplink wireless signals that reach one or both of the UEs 111 and 112. At 1170, the base station generates uplink signal reports of measurements (e.g., SRS metrics) for the reflections of the uplink wireless signals that reach the base station. As described with reference to FIG. 5B, the base station may receive reflections of downlink wireless signals from one APD, multiple APDs, or no APDs when various combinations of respective uplink beams and APD phase vectors fail to result in a reflection that reaches the base station. Based on the uplink signal reports, the base station may implement other operations for MIMO transmissions with APDs. Optionally at 1175, the base station may perform another iteration of sub-diagram 1115 to implement another channel characterization process. For example, the base station may use the uplink signal reports to refine parameters for uplink beams or APD phase vector selection for a subsequent iteration of channel characterization. When the uplink channel characterization is complete, the base station may then group APDs and UEs as described with reference to FIGS. 5B-10 and 12.

Example Methods for MIMO Transmissions Using APDs

FIG. 12 illustrates example method(s) 1200 that can be used to implement various aspects of MIMO transmissions using APDs. In various implementations, operations of the methods 1200 are performed by or with a base station, UE(s), and APD(s) as described with reference to any of FIGS. 1-11. At times, aspects of the methods 1200 operate in conjunction with operations described with reference to FIGS. 5A through 9 and/or transactions described with reference to FIGS. 10 and 11 for implementing aspects of MIMO transmissions using APDs.

At 1205, a base station selects one or more APDs to use in at least one communication path for the MIMO transmissions with one or more UEs. For example, the base station may select candidate APDs within a threshold distance of one or more UEs with declining signal or link quality measurements. To illustrate, the base station (e.g., the base station 120) selects one or more APDs (e.g., the APD 181, the APD 182) to use in communication paths to one or more UEs (e.g., the UE 111, the UE 112) in response to identifying signal degradation indicated by signal and/or link quality measurements as described with reference to FIG. 6, FIG. 8, and/or FIG. 10.

At 1210, the base station performs a channel characterization process using the one or more APDs and one or more UEs. The base station 120, for instance, performs a channel characterization process as described with reference to FIG. 5A, FIG. 5B, 1015 of FIG. 10, and/or FIG. 11. This can include the base station 120 directing the APD 181 and/or the APD 182 to apply multiple surface configurations, the base station 120 transmitting downlink CSI-RSs, and/or the UEs 110 transmitting uplink SRSs. In performing the channel characterization process, the base station 120 may receive downlink signal quality measurements from the UEs 110 (e.g., FIG. 5A or sub-diagram 1110 of FIG. 11) or may generate uplink signal quality measurements based on the uplink SRSs (e.g., FIG. 5B or sub-diagram 1115 of FIG. 11).

Optionally at 1215, the base station groups multiple UEs with at least one APD for MU-MIMO transmissions. For example, the base station 120 selects the UE 111 and the UE 112 to pair or group for MU-MIMO transmissions as described with reference to FIG. 6, FIG. 8, or 1020 of FIG. 10. Optionally at 1220, the base station groups one UE with at least one APD for SU-MIMO transmissions. For example, the base station 120 groups a UE 110 with multiple APDs 181 and 182 or partitions of the APD 181 for SU-MIMO transmissions as described with reference to FIG. 7 and/or FIG. 9.

At 1225, the base station configures the one or more APDs for the MIMO transmissions based on the channel characterization process. For instance, the base station 120 directs the APD 181 to apply a first surface configuration and the APD 182 to apply a second surface configuration as described at 1035 of FIG. 10. Alternatively or additionally, the base station 120 determines APD timing adjustments (e.g., using link quality measurements, using UE location information, using APD location information) as described at 1030 and configures the one or more APDs with the timing adjustments as described at 1035. In some aspects, the base station 120 determines UE timing adjustments and indicates the UE timing adjustments to the UE(s) 110 as described at 1040 of FIG. 10. At times, the base station 120 configures a single APD using panel-partitioning or sub-panels as described with reference to FIG. 7 or FIG. 9.

At 1230, the base station communicates with the one or more UEs using the MIMO transmissions and a respective surface of the one or more APDs. As a first example, the base station 120 communicates with the UE 111 and the UE 112 using the APD 181 and the APD 182 for MU-MIMO transmissions as described at 1045 of FIG. 10 or with respect to FIG. 6. As a second example, the base station 120 communicates with the UE 111 and the using the APD 181 and the APD 182 for SU-MIMO transmissions as described with respect to FIG. 7. As a third example, the base station 120 communicates with the UE 111 and the UE 112 using the APD 181 (with panel partitioning) for MU-MIMO transmissions as described with respect to FIG. 8. As a fourth example, the base station 120 communicates with the UE 111 and the using the APD 181 (with panel partitioning) for SU-MIMO transmissions as described with respect to FIG. 9.

The order in which the method blocks are described is not intended to be construed as a limitation, and any number of the described method blocks can be skipped or combined in any order to implement a method or an alternative method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or additionally, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Although aspects of MIMO transmissions using APDs have been described in language specific to features and/or methods, the subject of the appended claims is not necessarily limited to the specific features or methods described. Rather, the specific features and methods are disclosed as example implementations of MIMO transmissions using APDs and other equivalent features and methods are intended to be within the scope of the appended claims. Thus, the appended claims include a list of features that can be selected in "any combination thereof," which includes combining any number and any combination of the listed features. Further, various different aspects are described, and it is to be appreciated that each described aspect can be implemented independently or in connection with one or more other described aspects.

A number of exemplary aspects are now set out.

Aspect 1. A method performed by a base station for communicating with at least one user equipment, UE, in a wireless network using multiple-input, multiple-output, MIMO, transmissions and at least one adaptive phase-changing device, APD, the method comprising: selecting the at least one APD to use in at least one communication path for the MIMO transmissions; performing a channel characterization process for the at least one communication path using the at least one APD and the at least one UE; configuring the at least one APD for the MIMO transmissions based on the channel characterization process; and communicating with the at least one UE through the at least one communication path using the MIMO transmissions and a respective surface of each of the at least one APD.

2. The method as recited in claim 1, further comprising:

A single UE of the at least one UE may be selected based on the channel characterization process, and the MIMO transmissions may be implemented as single user-MIMO, SU-MIMO, transmissions between the base station and the single UE. Multiple UEs of the at least one UE may be selected based on the channel characterization process, and the MIMO transmissions may be implemented as multiple user-MIMO, MU-MIMO, transmissions between the base station and the multiple UEs.

Performing the channel characterization process may comprise transmitting one or more channel state information reference signals, CSI-RSs, towards the respective surface of the at least one APD. Performing the channel characterization process may comprise receiving one or more sounding reference signals, SRSs, from the at least one UE using the respective surface of the at least one APD. Performing the channel characterization process may comprise, in response to transmitting the one or more CSI-RSs, receiving one or more respective downlink signal or link quality measurements from the at least one UE. Performing the channel characterization process may comprise, in response to receiving the one or more SRSs, generating one or more respective uplink signal or link quality measurements. Configuring the at least one APD for the MIMO transmissions based on the channel characterization process may comprise analyzing at least one of: the one or more respective downlink signal or link quality measurements; or the one or more respective uplink signal or link quality measurements. A respective surface configuration may be selected for each of the at least one APD based on the analyzing.

Performing the channel characterization process may comprise selecting, for each APD of the at least one APD, a respective beam-sweeping pattern to apply during the channel characterization process. Each APD of the at least one APD may be directed to apply the respective beam-sweeping pattern during the channel characterization process. Performing the channel characterization process may comprises associating each CSI-RS of the one or more CSI-RSs to a respective surface configuration included in the respective beam-sweeping pattern. Performing the channel characterization process may comprises associating each SRS of the one or more SRSs to the respective surface configuration included in the respective beam-sweeping pattern. Performing the channel characterization process may comprise assigning a respective MIMO transmission configuration to the respective surface configuration. Configuring the APD may comprise identifying MIMO transmission configurations for the MIMO transmissions based on the channel characterization process and the assigning. Communicating with the at least one UE may comprise communicating with each UE of the at least one UE using the MIMO transmission configurations for the MIMO transmissions.

Configuring the at least one APD for the MIMO transmissions may comprises indicating a respective APD timing adjustment to each APD of the at least one APD. The at least one APD may be directed to apply the surface configuration using the respective APD timing adjustment. The at least one APD may includes at least two APDs and a respective APD timing adjustment may be indicated to each APD of the at least two APDs.

Determining the respective APD timing adjustment may be based on at least one of: a physical downlink shared channel, PDSCH, MIMO transmission time; a physical uplink shared channel, PUSCH, MIMO transmission time; a respective location of each UE in the at least one UE; or a respective location of each APD in the at least one APD.

Indicating the respective APD timing adjustment to each APD of the at least one APD may comprise communicating the respective APD timing adjustment to each APD of the at least one APD using an APD control channel that utilizes frequency transmissions in a frequency band that is lower than a frequency band of the MIMO transmissions.

Selecting the at least one UE for the MIMO transmissions may comprise selecting a first UE and a second UE for MU-MIMO communication. Communicating with the first UE and the second UE using the MIMO transmissions may comprise implementing the MU-MIMO communication by: communicating with the first UE using a first MIMO transmission of the MIMO transmissions and by including a first APD of the at least one APD in a first communication path for the first MIMO transmission; and communicating with the second UE using a second MIMO transmission of the MIMO transmissions and by including a second APD of the at least one APD in a second communication path for the second MIMO transmission.

Configuring the at least one APD for the MIMO transmissions may comprises at least one of selecting a first surface configuration for the first APD based, at least in part, on a first MU-MIMO transmission configuration specific to the first UE; or selecting a second surface configuration for the second APD based, at least in part, on a second MU-MIMO transmission configuration specific to the second UE.

Selecting the at least one UE for the MIMO transmissions may comprise selecting a single UE for SU-MIMO communication. Communicating with the single UE using the MIMO transmissions may comprise implementing the SU-MIMO communication by: communicating with the single UE using a first MIMO transmission of the MIMO transmissions and by including a first APD of the at least one APD in a first communication path for the first MIMO transmission; and communicating with the single UE using a second MIMO transmission of the MIMO transmissions and by including a second APD of the at least one APD in a second communication path for the second MIMO transmission.

Configuring the at least one APD for the MIMO transmissions may comprises at least one of: selecting a first surface configuration for the first APD based, at least in part, on an SU-MIMO transmission configuration of the single UE; or selecting a second surface configuration for the second APD based, at least in part, on the SU-MIMO transmission configuration of the single UE.

Selecting the at least one UE for the MIMO transmissions may comprise selecting a first UE and a second UE for MU-MIMO communication. Communicating with the first UE and the second UE using the MIMO transmissions may comprises implementing the MU-MIMO communication by: communicating with the first UE using a first MIMO transmission of the MIMO transmissions and including a first APD-surface-partition of a single APD of the at least one APD in a first communication path for the first MIMO transmission; and communicating with the second UE using a second MIMO transmission of the MIMO transmissions and by including a second APD-surface-partition of the single APD in a second communication path for the second MIMO transmission. Configuring the at least one APD for the MIMO transmissions comprises at least one of: selecting a first surface configuration for the first APD-surface-partition of the single APD based, at least in part, on a first MU-MIMO transmission configuration specific to the first UE; or selecting a second surface configuration for the second APD-surface-partition of the single APD based, at least in part, on a second MU-MIMO transmission configuration specific to the second UE.

Selecting the at least one UE for the MIMO transmissions may comprise selecting a single UE for SU-MIMO communication. Communicating with the single UE using the MIMO transmissions may comprise implementing the SU-MIMO communication by: communicating with the single UE using a first MIMO transmission of the MIMO transmissions and including a first APD-surface-partition of a single APD of the at least one APD in a first communication path for the first MIMO transmission; and communicating with the single UE using a second MIMO transmission of the MIMO transmissions and by including a second APD-surface-partition of the single APD in a second communication path for the second MIMO transmission. Configuring the at least one APD for the MIMO transmissions may comprise at least one of: selecting a first surface configuration for the first APD-surface-partition of the single APD based, at least in part, on an SU-MIMO transmission configuration for the single UE; or selecting a second surface configuration for the second APD-surface-partition of the single APD based, at least in part, on the SU-MIMO transmission configuration of the single UE.

Aspect 2. A base station comprising: at least one wireless transceiver; at least one processor; and computer-readable storage media comprising instructions that, responsive to execution by the at least one processor, direct the base station to perform the method of aspect 1.

Aspect 3. A computer-readable storage media comprising instructions that, responsive to execution by a processor, cause a method as recited in aspect 1 to be performed.

What is claimed is:

1. A method performed by a base station for communicating with multiple user equipments (UEs) in a wireless network using multiple-input, multiple-output (MIMO) transmissions and a first adaptive phase-changing device (APD) the method comprising:

selecting the first APD to use in at least one communication path for the MIMO transmissions;

selecting a first UE and a second UE for multiple user-MIMO (MU-MIMO) communication;

performing a channel characterization process for the at least one communication path using the first APD and the first UE and second UE;

configuring the first APD for the MIMO transmissions based on the channel characterization process, the configuring comprising:

coordinating application of concurrent phase vectors to be applied by the first APD such that:

a first APD-surface-partition is time-aligned with Physical Downlink Shared Channel (PDSCH) and Physical Uplink Shared Channel (PUSCH) transmissions between the first UE and the base station; and a second APD-surface-partition is time-aligned with PDSCH and PUSCH transmissions between the second UE and the base station;

communicating with the first UE using a first MIMO transmission of the MIMO transmissions and including the first APD-surface-partition in a first communication path for the first MIMO transmission; and communicating with the second UE using a second MIMO transmission of the MIMO transmissions and by including the second APD-surface-partition in a second communication path for the second MIMO transmission.

2. The method as recited in claim 1, wherein the performing of the channel characterization process comprises:

transmitting one or more channel state information reference signals (CSI-RSs) towards a respective surface of the first APD; or receiving one or more sounding reference signals (SRSs) from the UEs using the respective surface of the first APD.

3. The method as recited in claim 2, wherein the performing of the channel characterization process comprises:

in response to transmitting the one or more CSI-RSs, receiving one or more respective downlink signal or link quality measurements from the UEs; or in response to receiving the one or more SRSs, generating one or more respective uplink signal or link quality measurements;

wherein the configuring of the first APD for the MIMO transmissions based on the channel characterization process comprises:

analyzing at least one of:

the one or more respective downlink signal or link quality measurements; or the one or more respective uplink signal or link quality measurements; and selecting, based on the analyzing, a surface configuration for the first APD.

4. The method as recited in claim 2, wherein the performing of the channel characterization process comprises:

selecting, for the first APD, a respective beam-sweeping pattern to apply during the channel characterization process;

directing the first APD to apply the respective beam-sweeping pattern during the channel characterization process; and assigning a MIMO transmission configuration to a respective surface configuration;

wherein the configuring of the first APD comprises:

identifying MIMO transmission configurations for the MIMO transmissions based on the channel characterization process and the assigning, and wherein the communicating with the first UE and communicating with the second UE comprises:

communicating using the MIMO transmission configurations for the MIMO transmissions.

5. The method as recited in claim 4 wherein the performing of the channel characterization process comprises:

associating each CSI-RS of the one or more CSI-RSs to a respective surface configuration included in the respective beam-sweeping pattern; or associating each SRS of the one or more SRSs to the respective surface configuration included in the respective beam-sweeping pattern.

6. The method as recited in claim 1, wherein the configuring of the first APD for the MIMO transmissions comprises:

indicating an APD timing adjustment to the first APD; and directing the first APD to apply a surface configuration using a respective APD timing adjustment.

7. The method as recited in claim 6, further comprising:

determining the APD timing adjustment based on at least one of:

a physical downlink shared channel (PDSCH) MIMO transmission time;

a physical uplink shared channel (PUSCH) MIMO transmission time;

a respective location of each UE of the UEs; or a location of the first APD.

8. The method as recited in claim 6, wherein the indicating of the APD timing adjustment to the first APD comprises:

communicating the APD timing adjustment to the first APD using an APD control channel that utilizes frequency transmissions in a frequency band that is lower than a frequency band of the MIMO transmissions.

9. The method as recited in claim 6, wherein the configuring of the first APD for the MIMO transmissions comprises:

calculating a first timing advance value for the first UE; and calculating a second timing advance value for the second UE;

wherein the indicating the APD timing adjustment to the first APD is based at least in part on the first timing advance value or the second timing advance value.

10. The method as recited in claim 1, wherein:

the configuring of the first APD for the MIMO transmissions comprises at least one of:

selecting a first surface configuration for the first APD-surface-partition of the first APD based, at least in part, on a first MU-MIMO transmission configuration specific to the first UE; or selecting a second surface configuration for the second APD-surface-partition of the first APD based, at least in part, on a second MU-MIMO transmission configuration specific to the second UE.

11. The method as recited in claim 1, wherein the communicating with the first UE and communicating with the second UE comprises:

simultaneously communicating with the first UE and second UE.

12. The method as recited in claim 1, wherein the communicating with the first UE comprises:

communicating user-plane data with the first UE; and wherein the communicating with the second UE comprises:

communicating user-plane data with the second UE.

13. The method as recited in claim 1, wherein the communicating with the first UE comprises:

communicating control-plane information with the first UE; and wherein the communicating with the second UE comprises:

communicating control-plane information with the second UE.

14. A base station comprising:

at least one wireless transceiver;

at least one processor; and computer-readable storage media comprising instructions executable by the at least one processor, to direct the base station to:

select a first adaptive phase-changing device (APD) to use in at least one communication path for multiple-input, multiple-output (MIMO) transmissions;

select a first UE and a second UE for multiple user-MIMO (MU-MIMO) communication;

perform a channel characterization process for the at least one communication path using the first APD and the first UE and second UE;

configure the first APD for the MIMO transmissions based on the channel characterization process, the configuration directing the base station to:

coordinate application of concurrent phase vectors to be applied by the first APD such that:

a first APD-surface-partition is time-aligned with Physical Downlink Shared Channel (PDSCH) and Physical Uplink Shared Channel (PUSCH) transmissions between the first UE and the base station; and a second APD-surface-partition is time-aligned with PDSCH and PUSCH transmissions between the second UE and the base station;

communicate with the first UE using a first MIMO transmission of the MIMO transmissions and including the first APD-surface-partition in a first communication path for the first MIMO transmission; and communicate with the second UE using a second MIMO transmission of the MIMO transmissions and by including the second APD-surface-partition in a second communication path for the second MIMO transmission.

15. The base station as recited in claim 14, wherein the instructions to perform the channel characterization process are executable to direct the base station to:

transmit one or more channel state information reference signals (CSI-RSs) towards a respective surface of the first APD; or receive one or more sounding reference signals (SRSs) from the UEs using the respective surface of the first APD.

16. The base station as recited in claim 15, wherein the instructions to perform of the channel characterization process are executable to direct the base station to:

in response to the transmission of the one or more CSI-RSs, receive one or more respective downlink signal or link quality measurements from the UEs; or in response to the reception of the one or more SRSs, generate one or more respective uplink signal or link quality measurements;

wherein the configuration of the first APD for the MIMO transmissions based on the channel characterization process comprises:

analyzing at least one of:

the one or more respective downlink signal or link quality measurements; or the one or more respective uplink signal or link quality measurements; and selecting, based on the analyzing, a surface configuration for the first APD.

17. The base station as recited in claim 15, wherein the instructions to perform the channel characterization process are executable to direct the base station to:

select, for the first APD, a respective beam-sweeping pattern to apply during the channel characterization process;

direct the first APD to apply the respective beam-sweeping pattern during the channel characterization process; and assign a MIMO transmission configuration to a respective surface configuration;

wherein the configuration of the first APD comprises:

identifying MIMO transmission configurations for the MIMO transmissions based on the channel characterization process and the assigning, and wherein the communication with the first UE and communicating with the second UE comprises:

communicating using the MIMO transmission configurations for the MIMO transmissions.

18. The base station as recited in claim 17, wherein the instructions to perform the channel characterization process are executable to direct the base station to:

associate each CSI-RS of the one or more CSI-RSs to a respective surface configuration included in the respective beam-sweeping pattern; or associate each SRS of the one or more SRSs to the respective surface configuration included in the respective beam-sweeping pattern.

19. The base station as recited in claim 14, wherein the instructions to configure the first APD for the MIMO transmissions are executable to direct the base station to:

indicate an APD timing adjustment to the first APD; and direct the first APD to apply a surface configuration using a respective APD timing adjustment.

20. The base station as recited in claim 19, the instructions executable to direct the base station to:

determine the APD timing adjustment based on at least one of:

a physical downlink shared channel (PDSCH) MIMO transmission time;

a physical uplink shared channel (PUSCH) MIMO transmission time;

a respective location of each UE of the UEs; or a location of the first APD, and wherein the instructions to indicate the APD timing adjustment to the first APD are executable to direct the base station to:

communicate the APD timing adjustment to the first APD using an APD control channel that utilizes frequency transmissions in a frequency band that is lower than a frequency band of the MIMO transmissions.

\* \* \* \* \*